United States Patent
Tsunezumi et al.

(10) Patent No.: US 8,833,568 B2
(45) Date of Patent: Sep. 16, 2014

(54) CONTROLLER STAND DEVICE AND CONTROLLER STAND SYSTEM

(75) Inventors: Kazuyasu Tsunezumi, Kanagawa (JP); Takamasa Araki, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 437 days.

(21) Appl. No.: 13/095,170

(22) Filed: Apr. 27, 2011

(65) Prior Publication Data

US 2011/0266231 A1    Nov. 3, 2011

(30) Foreign Application Priority Data

Apr. 30, 2010    (JP) ................... 2010-105878

(51) Int. Cl.
*A47F 7/00*        (2006.01)
*A63F 13/98*       (2014.01)

(52) U.S. Cl.
CPC .......... *A63F 13/02* (2013.01); *A63F 2300/1043* (2013.01); *A63F 2300/1025* (2013.01)
USPC ...................................... 211/26.1

(58) Field of Classification Search
USPC ........... 248/309.1, 311.2, 314, 316.8, 346.01, 248/346.03, 346.5, 316.4, 316.6, 201; 292/32, 33, 38, 39, 137, 138, 142, 150; 211/26.1
See application file for complete search history.

(56) References Cited

U.S. PATENT DOCUMENTS 5,385,325 A * 1/1995 Rigsby .......................... 248/313
5,601,194 A * 2/1997 Brinston ...................... 211/26.1
5,828,750 A * 10/1998 Perala ........................... 379/446
5,836,563 A * 11/1998 Hsin-Yung .................. 248/316.4
5,947,359 A * 9/1999 Yoshie ........................... 224/570
6,231,444 B1   5/2001 Goto et al.
7,478,789 B2   1/2009 Yukawa et al.

(Continued)

FOREIGN PATENT DOCUMENTS

CN    101060761    10/2007
CN    101164034    4/2008

(Continued)

OTHER PUBLICATIONS

Chinese First Office Action Dated Apr. 26, 2013, from corresponding Chinese Application No. 201110110092.5.

(Continued)

*Primary Examiner* — Darnell Jayne
*Assistant Examiner* — Andrew Roersma
(74) *Attorney, Agent, or Firm* — Katten Muchin Rosenman LLP

(57) ABSTRACT

To provide a controller stand device capable of stably standing any of two controllers having different thickness. A controller stand device has a pedestal having a support concave formed thereon, the support concave having a size large enough to accept the first controller inserted therein. The controller stand device has a support member to be pressed onto the external surface of the controller inserted in the support concave to thereby stand the controller. The support member is capable of moving between a first support position in which the support member is pressed onto the external surface of the first controller when the first controller is inserted in the support concave and a second position in which the support member is pressed onto the external surface of the second controller when the second controller is inserted in the support concave.

13 Claims, 16 Drawing Sheets

(56) References Cited

U.S. PATENT DOCUMENTS

| | | | |
|---|---|---|---|
| 7,719,830 B2 | 5/2010 | Howarth et al. | |
| 7,933,117 B2 | 4/2011 | Howarth et al. | |
| 2003/0062458 A1* | 4/2003 | Leopold et al. | 248/310 |
| 2003/0220141 A1 | 11/2003 | Corrigan et al. | |
| 2006/0250764 A1* | 11/2006 | Howarth et al. | 361/683 |
| 2007/0060391 A1* | 3/2007 | Ikeda et al. | 463/46 |
| 2007/0235617 A1 | 10/2007 | Yukawa et al. | |
| 2008/0239658 A1* | 10/2008 | Chou et al. | 361/686 |
| 2009/0294617 A1* | 12/2009 | Stacey et al. | 248/316.1 |
| 2010/0020013 A1* | 1/2010 | Hirata et al. | 345/161 |
| 2010/0181455 A1* | 7/2010 | Ou et al. | 248/316.4 |
| 2010/0188808 A1 | 7/2010 | Howarth et al. | |
| 2012/0001048 A1* | 1/2012 | Takahashi et al. | 248/346.03 |

FOREIGN PATENT DOCUMENTS

| | | | | |
|---|---|---|---|---|
| CN | 101369181 | | 2/2009 | |
| JP | 2000-172431 | | 6/2000 | |
| JP | U3089139 | | 10/2002 | |
| JP | 2003-319566 | | 11/2003 | |
| JP | U3112772 | | 8/2005 | |
| JP | 2008-118798 | | 5/2008 | |
| JP | 2009-112144 | | 5/2009 | |
| JP | 2009200799 A | * | 9/2009 | G03B 17/56 |
| WO | WO2010095339 A1 | * | 8/2010 | H02J 7/00 |

OTHER PUBLICATIONS

Chinese Second Office Action Dated Dec. 17, 2013, from corresponding Chinese Application No. 201110110092.5.

Japanese Office Action dated Jun. 24, 2014 for the Corresponding Japanese Patent Application No. 2010-105878.

SCEJ, 36 Companies decided to participate in support for "PlayStation Move Motion Controller" PlayStation Move Sub-Controller' will go on sale at the same time, Game Watch, Impress Watch Corporation, Mar. 11, 2010, URL, http://game.watch.impress.co.jp/docs/news/20100311_353979.html.

* cited by examiner

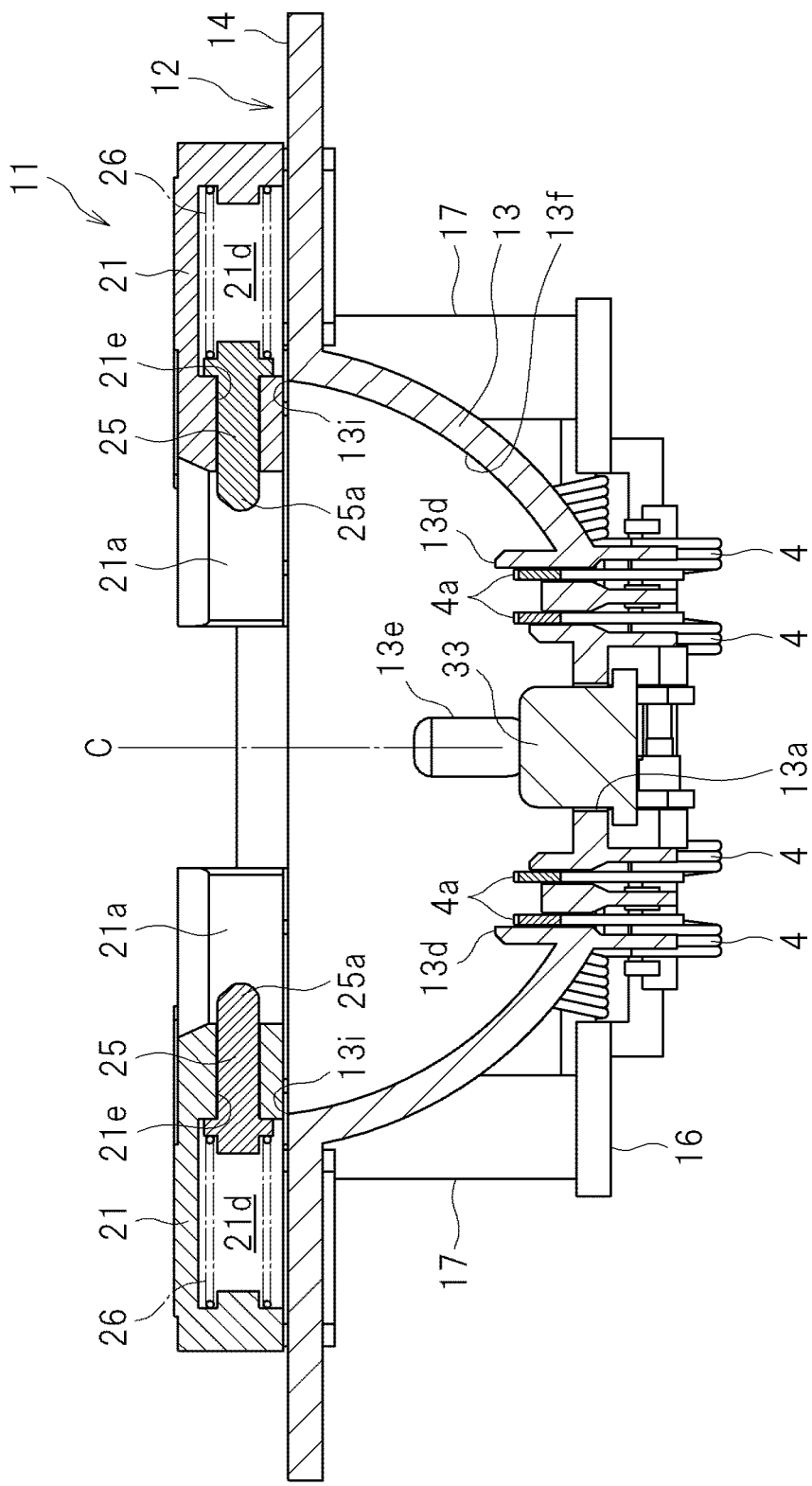

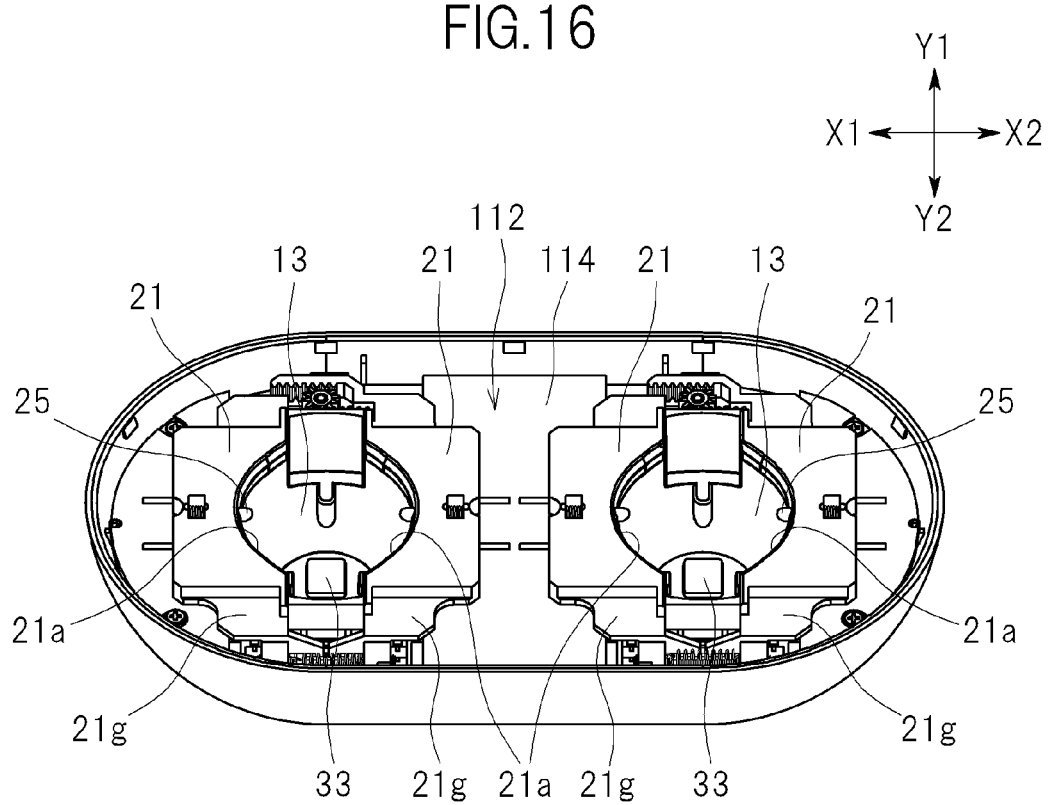

CONTROLLER STAND DEVICE AND CONTROLLER STAND SYSTEM

CROSS-REFERENCE TO RELATED APPLICATION

The present application claims priority from Japanese application JP2010-105878 filed on Apr. 30, 2010, the content of which is hereby incorporated by reference into this application.

BACKGROUND OF THE INVENTION

1. Field of the Invention

The present invention relates to a controller stand device usable to stand any of two controllers having different thickness, and a controller stand system including the same.

2. Description of the Related Art

Conventional game devices and/or audio visual devices employ controllers for manual operation by a user (see, e.g., U.S. Pat. No. 6,231,444), such as one that can be operated by a user as being griped by one hand. In recent years, as electronic devices capable of using such controllers, there are available electronic devices that can use two controllers adapted to operations in different manners by a user. For example, there are available game devices that employ a controller to be operated by a user mainly with buttons and another that detects, when being swung by a user, the swing and outputs a signal in accordance with the swing detected. The thicknesses of such controllers are designed according to the manner of operation by a user.

SUMMARY OF THE INVENTION

A stand device for standing such controllers, when not used, in their standing positions has been studied. However, a stand device adapted to only one of two controllers having different thickness is not convenient as being unable to stably standing the other controller.

According to one aspect of the present invention, a controller stand device comprises a pedestal having a concave formed thereon, the concave having a size that enables insertion therein of any of a first controller and a second controller each formed into a rod shape and having thicknesses different from each other; and a support member mounted on the pedestal so as to move between a first position in which the support member is pressed onto an external surface of the first controller when the first controller is inserted in the concave and a second position in which the support member is pressed onto an external surface of the second controller when the second controller is inserted in the concave.

Further, according to one another aspect of the present invention, a controller stand system comprises a first controller formed into a rod shape; a second controller formed into a rod shape and having a thickness different from that of the first controller; and a controller stand device for standing the first controller and the second controller, wherein the controller stand device includes a pedestal having a concave formed thereon, the concave having a size that enables insertion therein of any of the first controller and the second controller, and a support member mounted on the pedestal so as to move between a first position in which the support member is pressed onto an external surface of the first controller when the first controller is inserted in the concave and a second position in which the support member is pressed onto an external surface of the second controller when the second controller is inserted in the concave.

According to the present invention, the controller stand device can stably stand any of the first controller and the second controller.

BRIEF DESCRIPTION OF THE DRAWINGS

FIG. 10 is a cross sectional view along the line X-X in FIG. 4;

FIG. 11 is a plan view showing movement of a support member provided in the stand device body.

FIG. 12 is a diagram showing movement of a stopper mechanism of the stand device body.

FIG. 13 is a diagram showing movement of the stopper mechanism of the stand device body.

FIG. 14 is a diagram explaining movement of a terminal provided to the controller stand device.

FIG. 15 is a perspective view of a controller stand device according to another embodiment of the present invention. FIG. 16 is a perspective view of the controller stand device shown in FIG. 15, with a cover member removed.

DETAILED DESCRIPTION OF THE INVENTION

Figure 1:
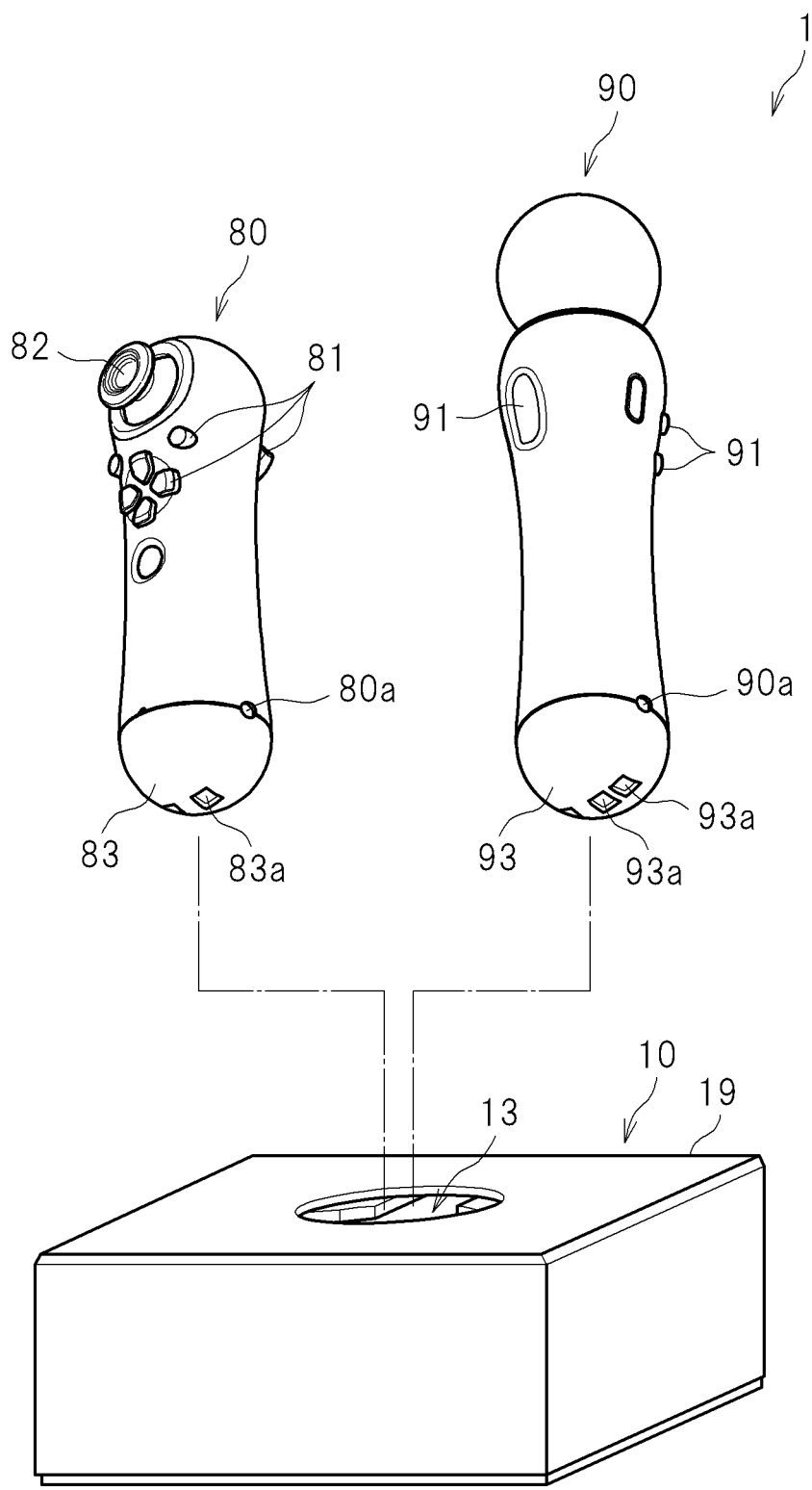
FIG. 1 is a diagram showing a structure of a controller stand system that is an example of an embodiment of the present invention.

In the following, one embodiment of the present invention will be described with reference to the accompanying drawings. FIG. 1 is a diagram showing a structure of a controller stand system 1 that is an example of an embodiment of the present invention.

As shown in FIG. 1, the controller stand system 1 comprises a first controller 90 and a second controller 80 for controlling an electronic device (not shown) according to a user operation. In this example, the second controller 80 and the first controller 90 are each a controller for controlling a game device according to a user operation. In use, a user grips both or one of the second controller 80 and the first controller 90 in hands/hand to operate.

The second controller 80 includes a plurality of press buttons 81 and an operational stick 82 capable of being inclined forward, backward, leftward, or rightward by a user to operate. The first controller 90 as well has a plurality of press buttons 91. The first controller 90 additionally has a built-in acceleration sensor for detecting, when, e.g., a user swings the first controller 90, the swing. In this example, in use, the second controller 80 and the first controller 90 are connected by radio to a game device, and output a signal in accordance with a user operation to the game device. The second controller 80 and the first controller 90 each includes a built-in chargeable battery and can be charged with a controller stand device 10 as to be described later.

The second controller 80 and the first controller 90 are each an elongated controller having rod shaped and different thickness from each other. In other words, the width (the width in a direction in which a support member 21 to be described later abuts on (in this example, the width in the left-right direction (X1-X2 direction))) of the second controller 80 differs from that of the first controller 90. Specifically, the second controller 80 is thinner than the first controller 90. The first controller 90 and the second controller 80 in this example are substantially cylindrical, and the outer diameter of the cross section (a cross section with a cross sectional surface orthogonal to the length direction of the second controller 80) of the second controller 80 is shorter than that of the cross section (a cross section with a cross sectional surface orthogonal to the length direction of the first controller 90) of the first controller 90. The bottom surface 83 of the second controller 80 and the bottom surface 93 of the first controller 90 are both formed round to be hemispherical.

Figure 2:
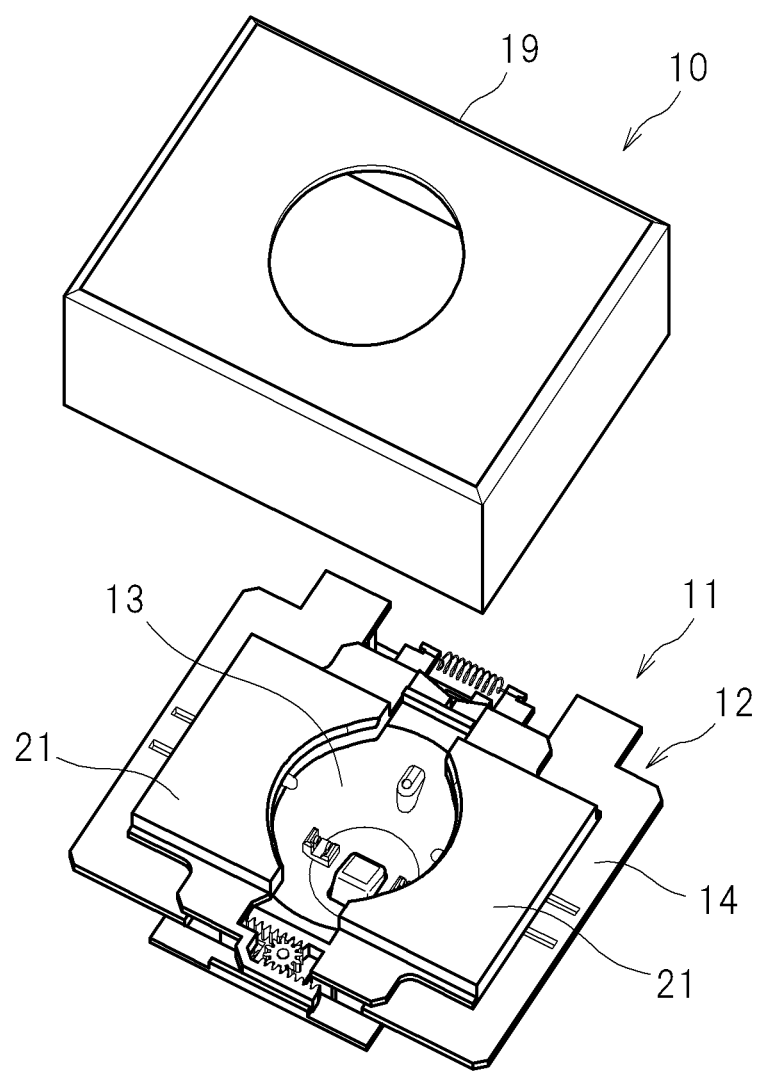
FIG. 2 is an exploded perspective view of a controller stand device constituting the controller stand system.
Figure 3:
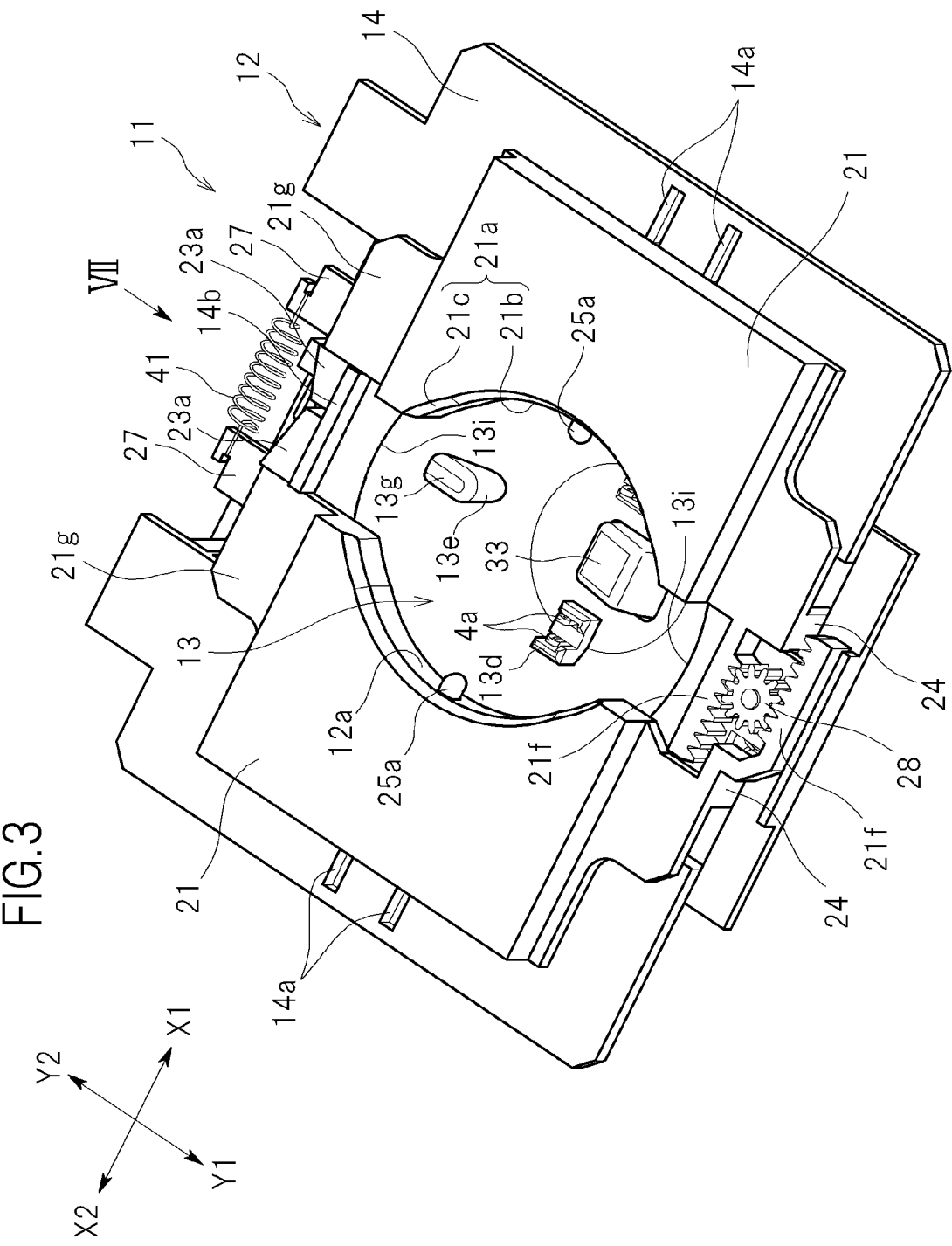
FIG. 3 is a perspective view of a stand device body of the controller stand device.
Figure 4:
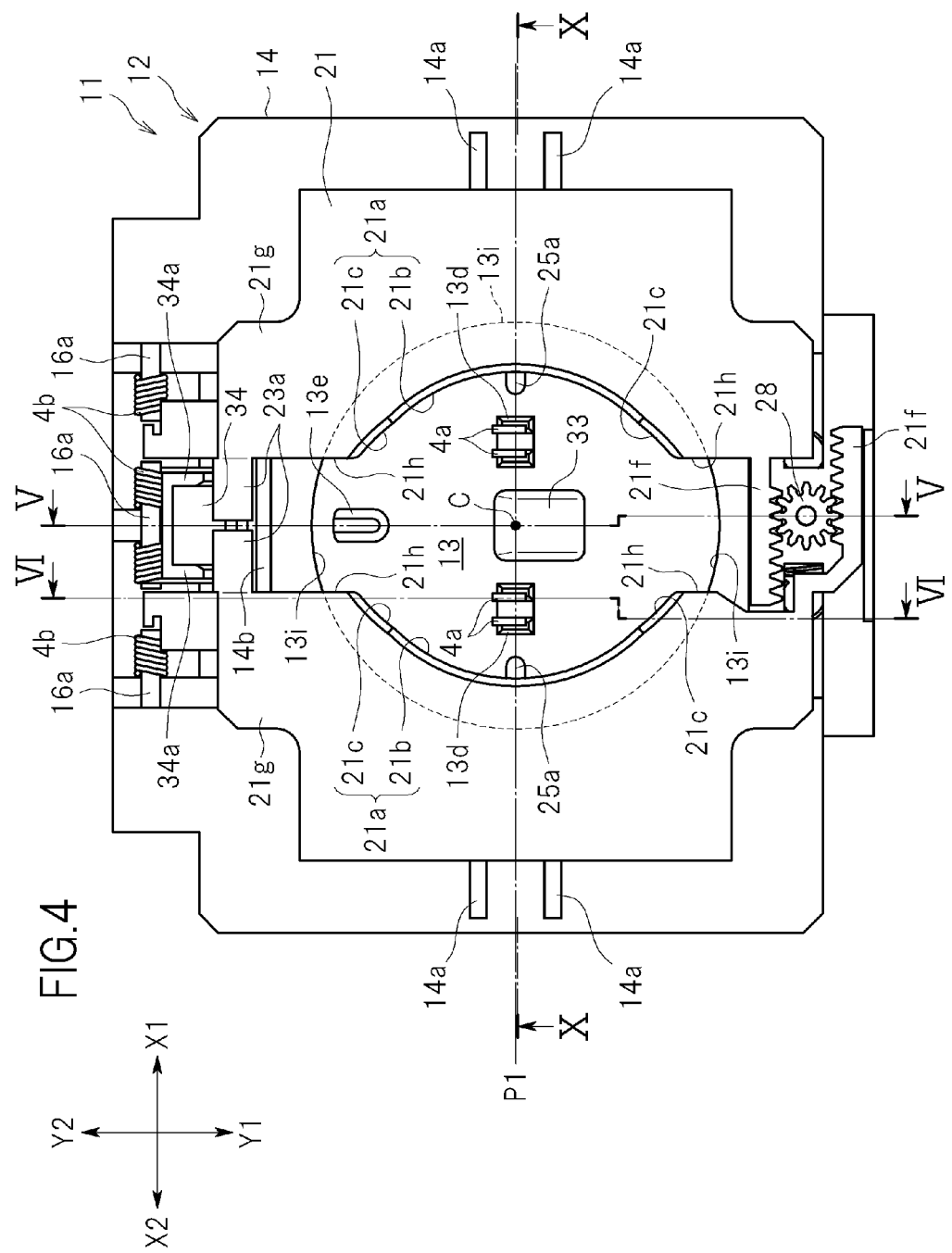
FIG. 4 is a plan view of the stand device body.
Figure 5:
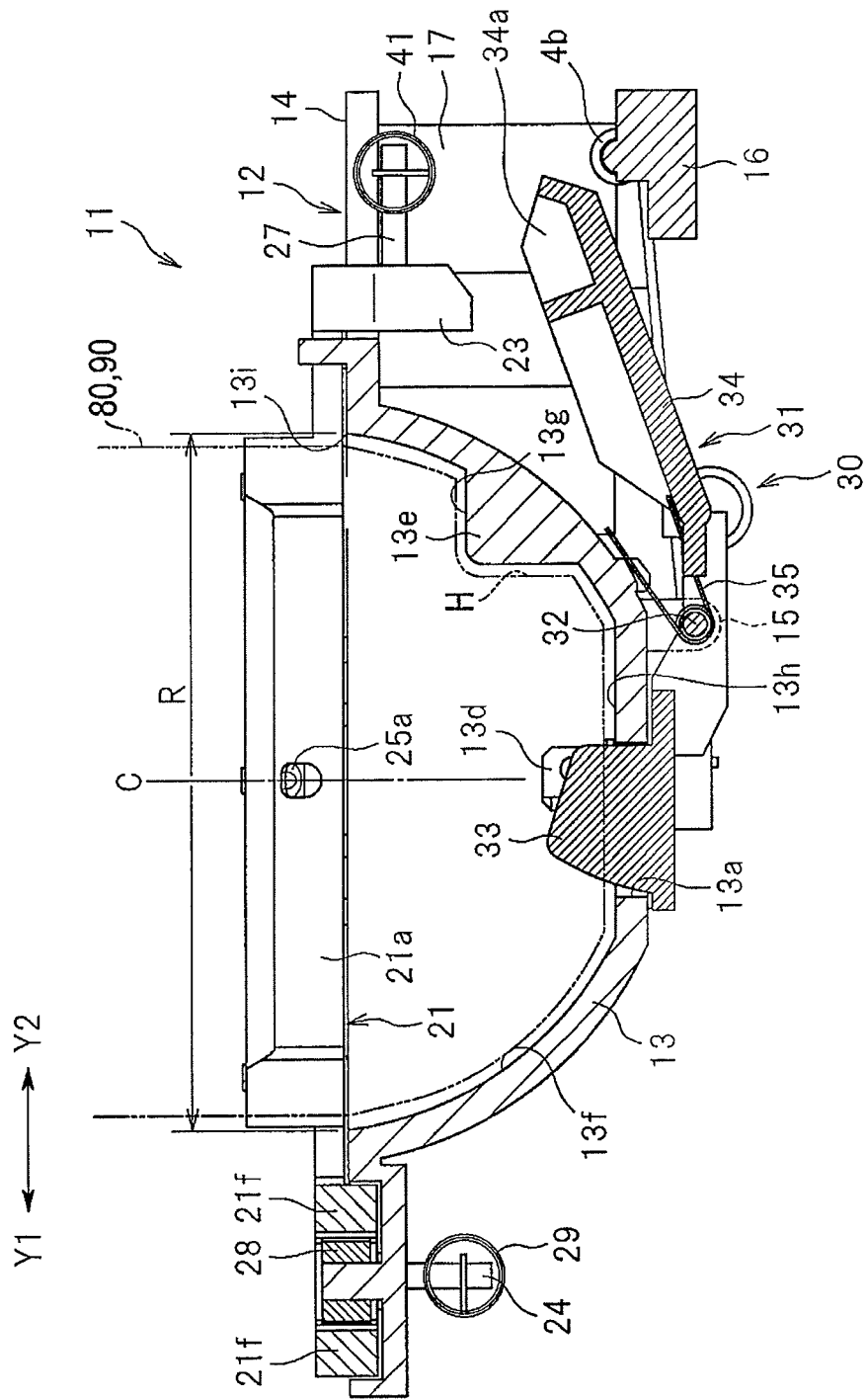
FIG. 5 is a cross sectional view along the line V-V in FIG. 4.
Figure 6:
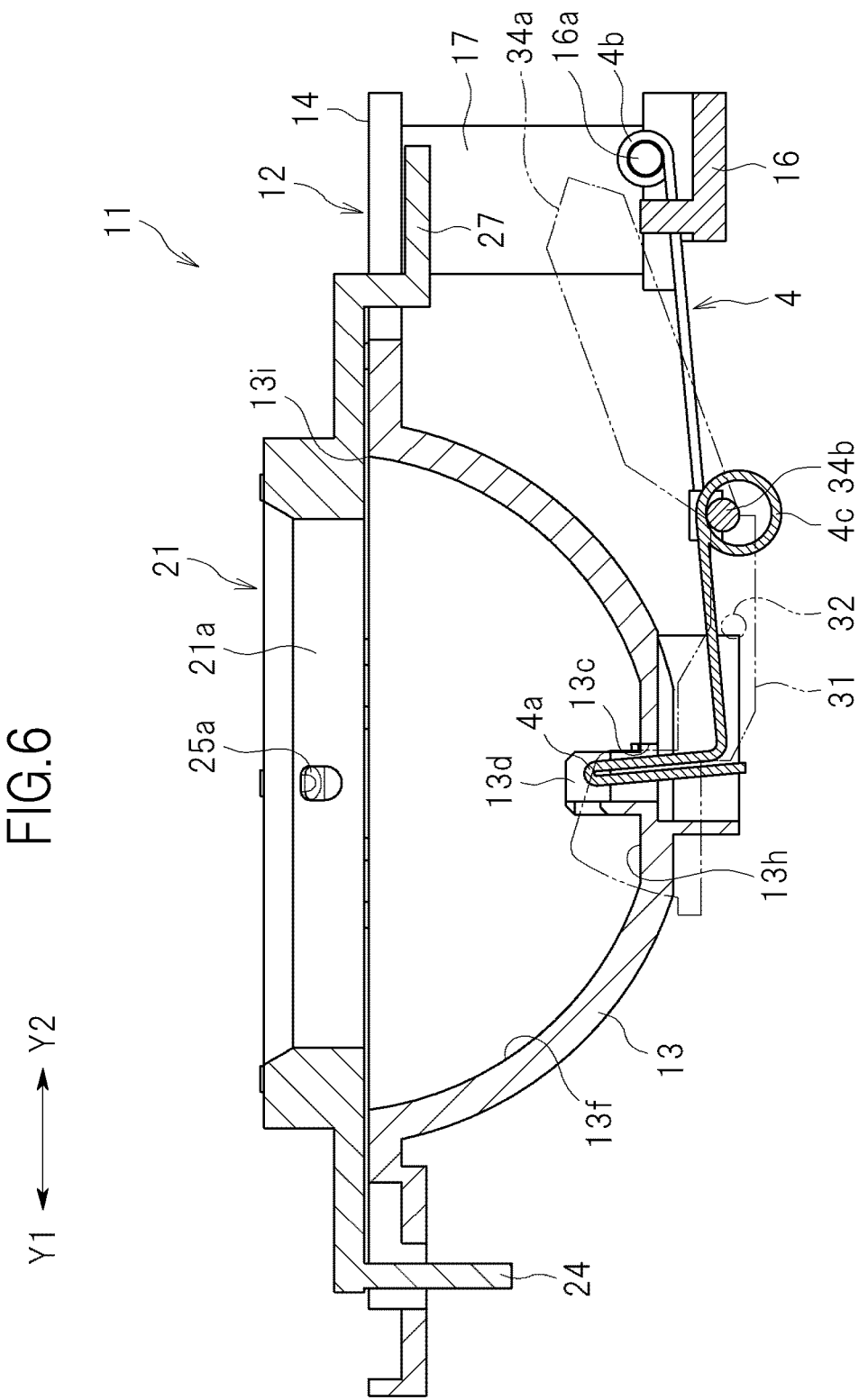
FIG. 6 is a cross sectional view along the line VI-VI in FIG. 4.
Figure 7:
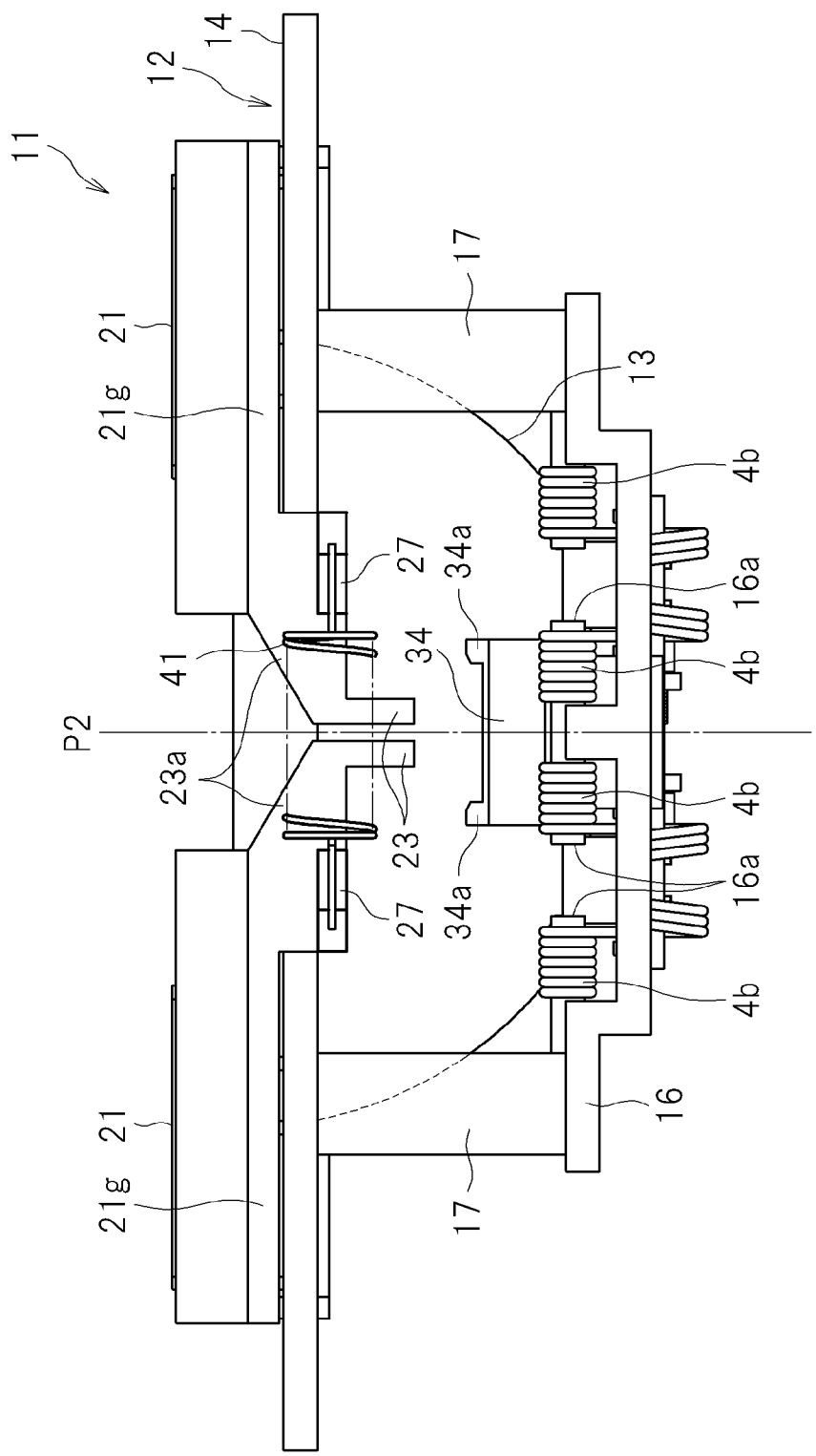
FIG. 7 is a rear view of the stand device body.
Figure 8:
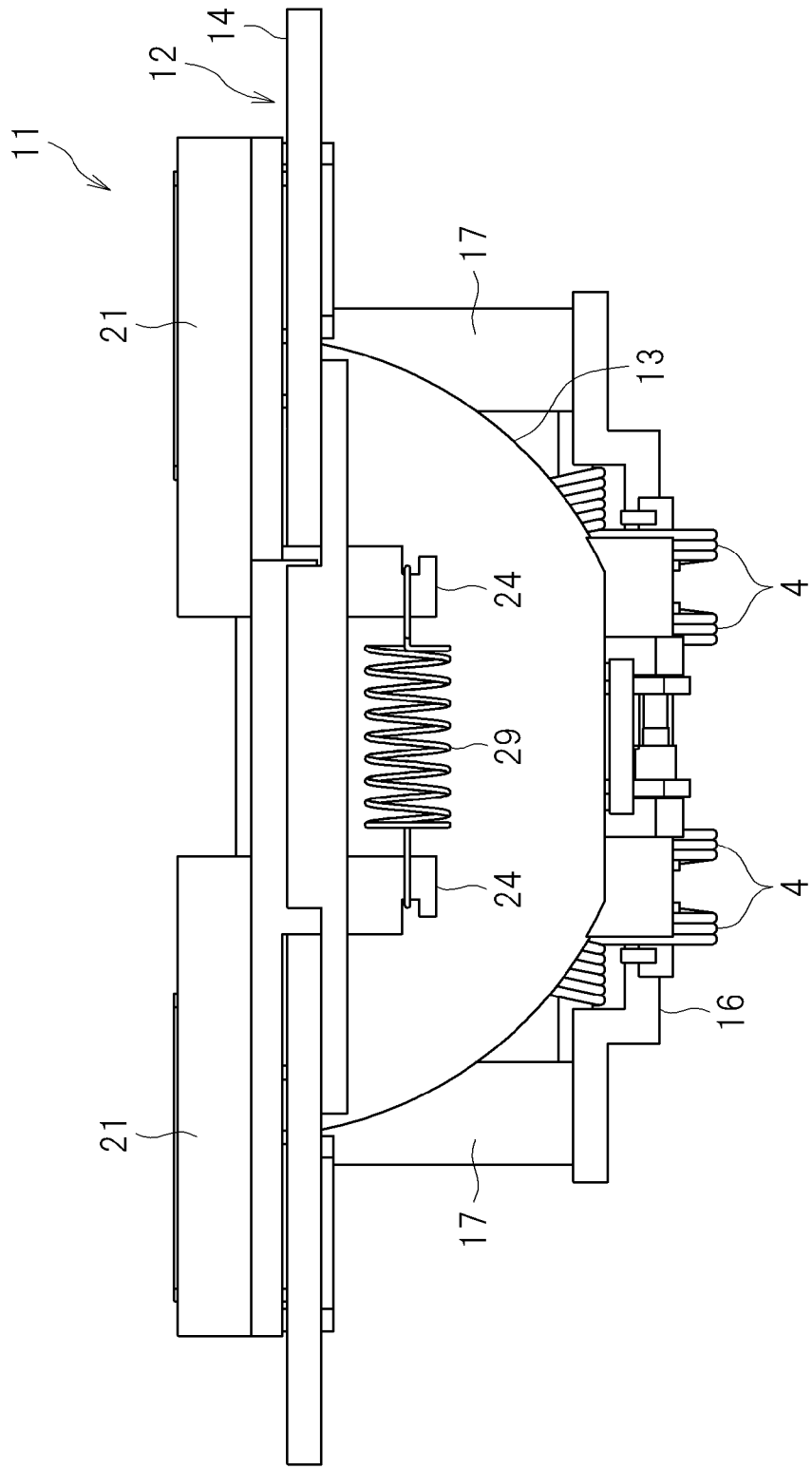
FIG. 8 is a front view of the stand device body.
Figure 9:
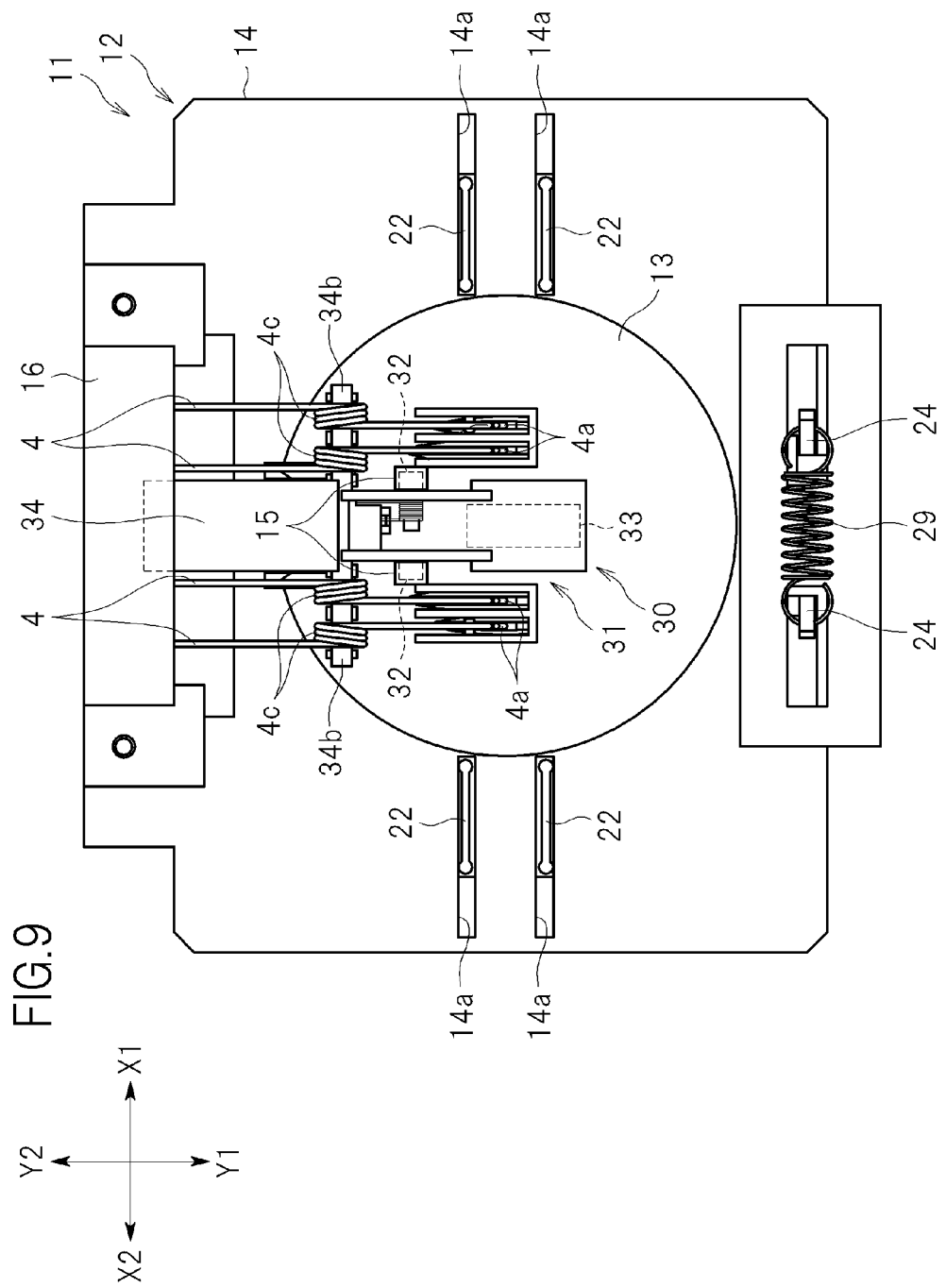
FIG. 9 is a bottom view of the stand device body.

As shown in FIG. 1, the controller stand system 1 includes a controller stand device 10 for standing the controller 80, 90. FIG. 2 is an exploded perspective view of the controller stand device 10. FIG. 3 is a perspective view of a stand device body 11 of the controller stand device 10. FIG. 4 is a plan view of the stand device body 11. FIG. 5 is a cross sectional view along the line V-V shown in FIG. 4. FIG. 6 is a cross sectional view along the line VI-VI shown in FIG. 4. FIG. 7 is a rear view of the stand device body 11, that is, a diagram showing the stand device body 11 viewed in the direction indicated by the arrow VII shown in FIG. 3. FIG. 8 is a front view of the stand device body 11. FIG. 9 is a bottom view of the stand device body 11. FIG. 10 is a cross sectional view along the line X-X shown in FIG. 4.

As shown in FIG. 2 or FIG. 3, the controller stand device 10 has the stand device body 11 accommodated in an housing 19, and the stand device body 11 includes a pedestal 12 for mounting the controller 80, 90 thereon.

As shown in FIG. 3 or FIG. 5, the pedestal 12 includes an upper panel 14 formed into a substantially flat panel. The upper panel 14 has a concave 13 (hereinafter referred to as a support concave) formed thereon being open upward. The support concave 13 has a dimension that can accept the lower portion (the hemispherical portion here) of the first controller 90, that is, the thicker one, inserted therein. The support concave 13 is formed substantially hemispherical to conform in shape with the hemispherical bottom surface 83, 93, and has an upper edge 13i formed substantially round. The inner diameter (the diameter R of the upper edge 13i) of the support concave 13 has a dimension in accordance with the thickness of the first controller 90. In this example, the dimension is substantially equal to the outer diameter of the first controller 90. Therefore, the lower portion of the second controller 80, that is, the thinner one, can be also inserted in the support concave 13.

As shown in FIG. 3, the stand device body 11 has two support members 21 to be pressed onto the external circumferential surface (that is, a substantially cylindrical part on the external surface, surrounding the central line of the controller 80, 90) of the controller 80, 90 inserted in the support concave 13 to thereby hold the controller 80, 90. The two support members 21 have substantially symmetrical shapes, facing each other in the left-right direction (the direction X1-X2 in the diagram).

As shown in FIG. 4 or FIG. 10, the support member 21 is formed in a panel shape and mounted on the upper panel 14. The width of the support member 21 in the front-rear direction (the Y1-Y2 direction) is wider than that of the support concave 13 in the front-rear direction, and the support member 21 covers a part (an outer portion) of the support concave 13 positioned below the support member 21. That is, the support member 21 extends toward the inside of the support concave 13 beyond the upper edge 13i of the support concave 13. In other words, the support member 21 extends toward the vertical central line C of the support concave 13 beyond the upper edge 13i of the support concave 13, so that the surfaces 21a of the left and right support members 21, that are opposed to each other (hereinafter referred to as contact surfaces), are positioned more inward than the upper edge 13i of the support concave 13.

The support member 21 can move in the left-right direction on the upper panel 14. In this example, the controller stand device 10 has two support members 21 provided capable of opening and closing. That is, the two support members 21 are arranged so as to approach to, or separate from, each other.

Figure 11A:
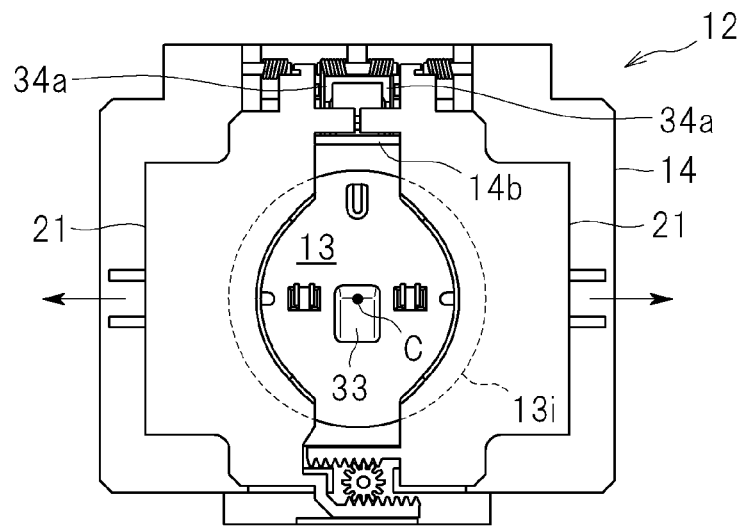
FIG. 11A shows the stand device body in a normal state without a controller mounted therein.
Figure 11B:
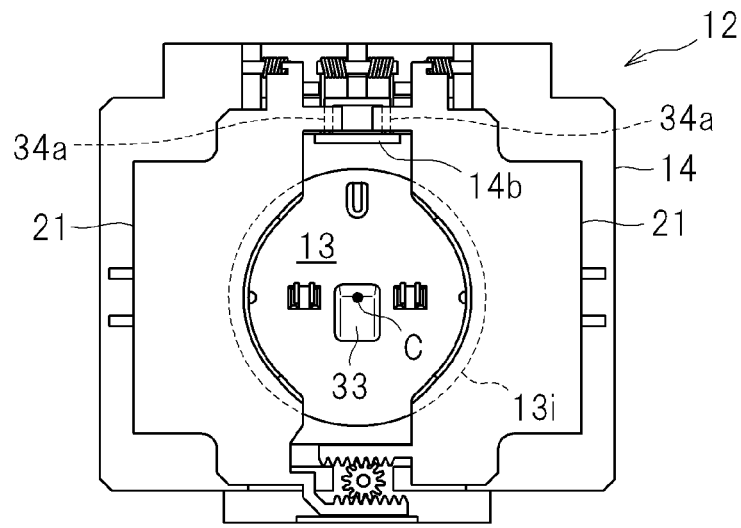
FIG. 11B shows the stand device body with a second controller mounted therein.
Figure 11C:
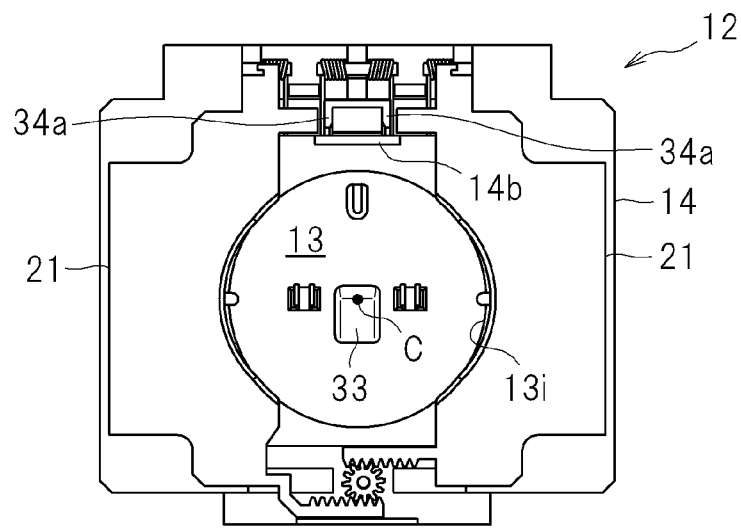
FIG. 11C shows the stand device body with a first controller mounted therein.

FIG. 11 is a plan view explaining movement of the support member 21. FIG. 11A shows the stand device body 11 in a normal state (with neither controller 80 nor 90 mounted therein); FIG. 11B shows the stand device body 11 with the second controller 80 mounted therein; and FIG. 11C shows the stand device body 11 with the first controller 90 mounted therein.

As described above, the support concave 13 has a size (dimension) that can accept the lower portion of any of the second controller 80 and the first controller 90 inserted therein. As shown in FIG. 11, the support member 21 can move between a position in which the support member 21 is pressed on the external circumferential surface of the first controller 90 inserted in the support concave 13 (the position of the support member 21 shown in FIG. 11C, hereinafter referred to as a first support position) and a position in which the support member 21 is pressed on the external circumferential surface of the second controller 80 inserted in the support concave 13 (the position of the support member 21 shown in FIG. 11B, hereinafter referred to as a second support position). In this example with the second controller 80 being thinner than the first controller 90, the second support position is located closer to the central line C of the support concave 13 than the first support position. That is, the second support position is a position more inward in the support concave 13 than the first support position, and therefore, the interval between the two support members 21 in the second support position is smaller than that in the first support position.

As shown in FIGS. 4 and 11A, the support member 21 in a normal state with no controller inserted in the support concave 13 is positioned further closer to the central line C of the support concave 13, i.e., further inward, than the second support position (hereinafter, the position of the support member 21 in the normal state is referred to as a normal position). That is, the smallest interval between the contact surfaces 21a of the left and right support members 21 is defined when the support members 21 are in the normal position.

The support member 21 is urged toward the normal position. In other words, the two support members 21 are urged to approach to each other. In this example, as shown in FIG. 8 or FIG. 9, a protrusion 24 protruding downward is formed on the front edge of each of the left and right support members 21, and a spring 29 is hooked on the respective protrusions 24 of the left and right support members 21 to impart a force to drag up the support members 21 to each other. Further, as shown in FIG. 3, a protrusion 27 protruding rearward is formed on a rear portion 21g of each of the left and right support members 21, and a spring 41 is hooked on the respective protrusions 27 of the left and right support members 21 to impart a force to drag up the support members 21 to each other. With this arrangement, the support members 21 return to the normal position when the second controller 80 or the first controller 90 is removed from the support concave 13.

As shown in FIG. 3, a stopper 14b is formed upright between the left and right support members 21 on the upper panel 14 of the pedestal 12. In this example, the stopper 14b is positioned between the rear portions 21g of the left and right support members 21 to prevent the rear positions 21g from moving beyond the normal position to get closer to each other.

When the second controller 80 is inserted into the support concave 13, the two support members 21 are forcibly separated from each other against the springs 29, 41 by the bottom surface 83 of the second controller 80, and resultantly, move from the normal position to the second support position. At the second support position, the support members 21 sandwich, to thereby hold, with the force of the springs 29, 41, the second controller 80 from the left and right respective sides thereof. Similarly, also when the first controller 90 is inserted into the support concave 13, the two support members 21 are forcibly separated from each other against the springs 29, 41 by the bottom surface 93, and resultantly, move from the normal position, passing the second support position, to the fist support position. At the fist support position, the support members 21 sandwich, to thereby hold, with the force of the springs 29, 41, the first controller 90 from the left and right respective sides thereof.

As shown in FIG. 4, the contact surfaces 21a of the support members 21 conform in shape with the external circumferential surfaces of the first controller 90 and the second controller 80. Specifically, in this example with the controllers 80, 90 being substantially cylindrical, the contact surface 21a is curved to conform with the external circumferential surfaces of the controllers 80, 90. Further, in this example with the two support members 21 arranged facing each other, the contact surface 21a of the support member 21 is curved to conform with the half of the external circumferential surface of the controller 80, 90, that is, being formed arc in a plan view. The two contact surfaces 21a together surround the external circumferential surface of the controller 80, 90 inserted in the support concave 13. In this regard, as the upper edge 13i of the support concave 13 is round, the contact surface 21a is curved to conform with the external circumferential surface of the controller 80, 90 and the upper edge 13i (see FIG. 11C). The upper edge 13i does not contact with the external circumferential surface of the controller 80, 90 inserted in the support concave 13, but the contact surface 21a does contact with the external circumferential surface thereof.

A space is ensured between the two contact surfaces 21a, and the upper edge 13i of the support concave 13 is partially exposed in the space. In detail, as shown in FIG. 4, each of the support members 21 has opposed surfaces 21h formed respectively thereon, that extend forward and rearward, respectively, from the respective edges of the arc contact surfaces 21a. The opposed surfaces 21h of the left and right support members 21 face each other, being apart from each other in the left-right direction. The upper edge 13i of the support concave 13 is partially exposed between the left and right opposed surfaces 21h. When the second controller 80, thinner than the first controller 90, is inserted in the support concave 13, a slight space is defined between the external circumferential surface of the second controller 80 and the exposed part of the upper edge 13i, so that the support concave 13 can be kept free from undesirable force applied from the second controller 80.

The curvature of the external circumferential surface differs between the two controllers 80, 90 because the second controller 80 is thinner than the first controller 90. Therefore, in this example, as shown in FIG. 4, each of the contact surface 21a includes a second contact surface 21b and two first contact surfaces 21c. The second contact surface 21b is capable of contacting on the external circumferential surface of the second controller 80; and the two first contact surfaces 21c, located on both sides of the second contact surface 21b, are capable of contacting on the external circumferential surface of the first controller 90. Each of the second contact surfaces 21b are capable of contacting on the external circumferential surface of the second controller 80 in at least two separate positions, respectively. In this example, the second contact surface 21b has an arc shape in accordance with the external circumferential surface of the second controller 80 and is capable of contacting, with the whole surface thereof, on the external circumferential surface of the second controller 80. The second contact surface 21b is formed to extend over the both sides of a plane P1 defined to include the central line C of the support concave 13 and be in parallel to the moving direction (the left-right direction (X1-X2 direction) in this example) of the support member 21. As a result, the second controller 80 can be prevented from inclining in the front-rear direction (the direction perpendicular to the moving direction of the support member 21) when being pressed by the support members 21. Meanwhile, the two first contact surfaces 21c are provided on the both sides of the plane P1. This arrangement can prevent the first controller 90 from inclining in the front-rear direction when being pressed by the support members 21. As described above, each support member 21 supports the controller 80, 90 in a plurality of points along the half of the external circumferential surface of the controller 80, 90.

A guide for regulating the moving direction of the support member 21 is formed on the pedestal 12 and the support member 21. In this example, as shown in FIG. 4 or FIG. 9, a plurality of elongated guide grooves 14a are formed to extend in the left-right direction on the upper panel 14. Specifically, two parallel guide grooves 14a are formed on each of the right and left sides of the upper panel 14. Meanwhile, the support member 21 has a plurality of protrusions 22 to be fit in the respective guide grooves 14a. With the protrusion 22 moving in the guide groove 14a, the support member 21 linearly moves in the left-right direction. In this example, the two support members 21 move in parallel but in opposite directions.

The two support members 21 has a member formed therebetween, which moves one support member 21 by a distance corresponding to the moving distance of the other support member 21. In this example, as shown in FIG. 3, the left and right support members 21 are connected to each other via a pinion gear 28 that rotates in connection with the movement of the support member 21. Each support member 21 has a rack 21f extending in the moving direction of the support member 21 (that is, the right or left direction) toward the support member 21 on the other side. The pinion gear 28 is arranged between the two racks 21f. The pinion gear 28 is engaged with the teeth formed on the rack 21f, so that the movement of one support member 21 is transmitted via the pinion gear 28 to the other support member 21. As a result, the two support members 21 move by an equidistance in the opposite directions.

As shown in FIG. 10, the support member 21 has an elongated engaging pin 25 protruding out toward the central line C in the radial direction of the support concave 13. The engaging pin 25 protrudes out from the contact surface 21a of the support member 21.

In this example, a storage space 21d is defined inside the support member 21. A hole 21e is formed on the contact surface 21a of the support member 21, extending to the storage space 21d. The engaging pin 25 sticks out from the storage space 21d into the hole 21e so that the tip end 25a of the engaging pin 25 protrudes out from the contact surface 21a toward the central line C. The two engaging pins 25 respectively formed on the left and right support members 21 face each other in the left and right direction.

Meanwhile, the external circumferential surface of the second controller 80 has, in positions corresponding to the positions of the respective tip ends 25a of the engaging pins 25, two recesses 80a formed thereon (see FIG. 1). Similarly, the external circumferential surface of the first controller 90 has, in positions corresponding to the positions of the respective tip ends 25a of the engaging pins 25, two recesses 90a formed thereon (see FIG. 1). When the controller 80, 90 is inserted in the support concave 13, the tip end 25a of the engaging pin 25 is fit in the recess 80a, 90a of the controllers 80, 90.

The direction in which the tip end 25a is fit in the recess 80a, 90a (the left-right direction in this example) is substantially perpendicular to the direction in which the controller 80, 90 is inserted in the support concave 13 (the up-down direction in this description). Therefore, the tip end 25a fit in the recess 80a, 90a can prevent the controller 80, 90 from coming off from the support concave 13. That is, upward movement of the controllers 80, 90 is prevented. In addition, rightward or leftward rotation of the controllers 80, 90 around the central line C of the support concave 13 can be prevented by the tip end 25a.

In this regard, as described above, the two support members 21 are provided capable of sandwiching the controller 80, 90 to thereby prevent the controller 80, 90 from inclining in the left-right direction. Further, as described above, the contact surfaces 21a of the respective support members 21 contact, in at least two positions defined on the both sides of the plane P1, on the external circumferential surface of the controller 80, 90 to thereby hold the controller 80, 90. And consequently, the controllers 80, 90 can be prevented from inclining in the front-rear direction by the left and right support members 21. Further, in this example, a convex 13e and a storage wall 13d, both protruding upward are formed in the support concave 13, as to be described later. Meanwhile, concaves for accepting the convex 13e and the storage wall 13d are formed on the controller 80, 90. Therefore, the controller 80, 90 can be prevented from inclining in the right-left and front-rear directions also by the convex 13e and the storage wall 13d inserted in the concaves formed on the controller 80, 90.

The engaging pin 25 is arranged such that the tip end 25a thereof protrudes out from the support member 21 and provided capable of retreating. That is, when the engaging pin 25 is in a normal position (the position free from a force from the controller 80, 90, that is, the position of the engaging pin 25 shown in FIG. 10), the tip end 25a protrudes out from the contact surface 21a. The engaging pin 25 is capable of retreating from the normal position, irrespective of the movement of the support member 21. In this example, as shown in FIG. 10, the engaging pin 25 is inserted into the hole 21e from the storage space 21d, and therefore, the tip end 25a of the engaging pin 25 can also retreat back toward the storage space 21d. A spring 26 is provided in the storage space 21d to urge the engaging pin 25 toward the normal position. That is, the spring 26 pushes the base portion 25b of the engaging pin 25 toward the central line C of the support concave 13.

When the controller 80, 90 is inserted in the support concave 13, the engaging pin 25 moves as described below. Initially, the bottom surface 83, 93 of the controller 80, 90 hits on the contact surfaces 21a of the support members 21 to thereby separate the two support members 21 apart. In the above, the bottom surface 83, 93 hits also on the tip end 25a of the engaging pin 25, and thereby the tip end 25a of the engaging pin 25 retreats back into the hole 21e formed on the contact surface 21a. When the recess 80a, 90a on the external circumferential surface thereof has come to the position of the engaging pin 25, the engaging pin 25 returns to the normal position, in which the tip end 25a thereof is fit in the recess 80a, 90a.

In this regard, the height of the position of the recess 80a (the distance from the lowest portion of the bottom surface 83 of the second controller 80 to the horizontal surface including the recess 80a) is equal to that of the recess 90a (the distance from the lowest portion of the bottom surface 93 of the first controller 90 to the horizontal surface including the recess 90a). Therefore, the position of the bottom surface 83 at the time when the second controller 80 inserted to be in a position in which the engaging pin 25 is fit in the recess 80a (in other word, the height is defined as the distance from the bottom surface 13h of the support concave 13 to the lowest portion of the bottom surface 83), is equal, in height, to the position of the bottom surface 93 at the time when the first controller 90 inserted to be in a position in which the engaging pin 25 is fit in the recess 90a.

As shown in FIG. 5, the controller stand device 10 has a stopper mechanism 30 for restricting the movement of the support member 21 from the second support position when the second controller 80, that is, the thinner one, is inserted in the support concave 13. The stopper mechanism 30 includes a pressed portion 33 that moves as being pressed by the controller 80, 90 inserted in the support concave 13. The stopper mechanism 30 additionally includes a stopper portion 34a that is movable together with the pressed portion 33. The stopper portion 34a can restrict movement of the support member 21. In this example, the stopper mechanism 30 includes a lever 31 arranged below the support concave 13. Specifically, the lever 31 is located below between the left and right support members 21. The pressed portion 33 and the stopper 34a are formed on the lever 31.

As shown in FIGS. 5 and 9, the lever 31 has a fulcrum 32 retained so as to rotate. In this example, the lever 31 includes two fulcrums 32 protruding in the left-right direction. The support concave 13 has two protrusions 15 formed on the lower surface thereof for retaining the fulcrums 32 so as to rotate. The lever 31 is arranged such that the rotational axis of the fulcrum 32 is directed in the moving direction (the left-right direction here) of the support member 21.

The pressed portion 33 is formed on one end of the lever 31. The lever 31 includes an arm 34 extending from the fulcrum 32 in the direction opposite from the pressed portion 33, and the stopper portion 34a is provided at the tip end of the arm 34. That is, the fulcrum 32 is located between the pressed portion 33 and the stopper portion 34a.

Figure 12A:
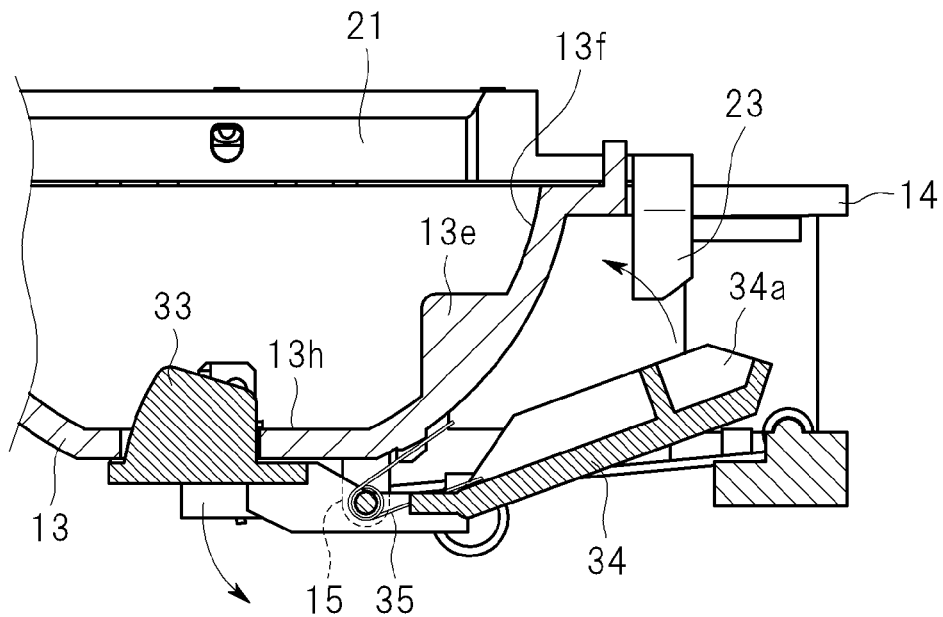
FIG. 12A shows the stand device body in a normal state and FIG. 12B shows the stand device body with the second controller mounted therein.
Figure 12B:
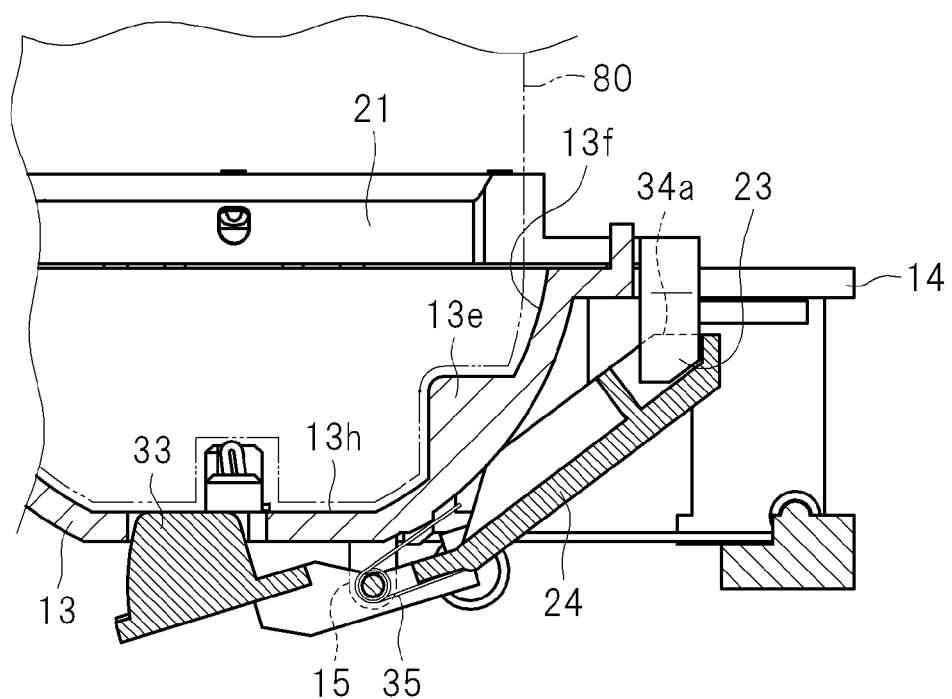
Figure 13A:
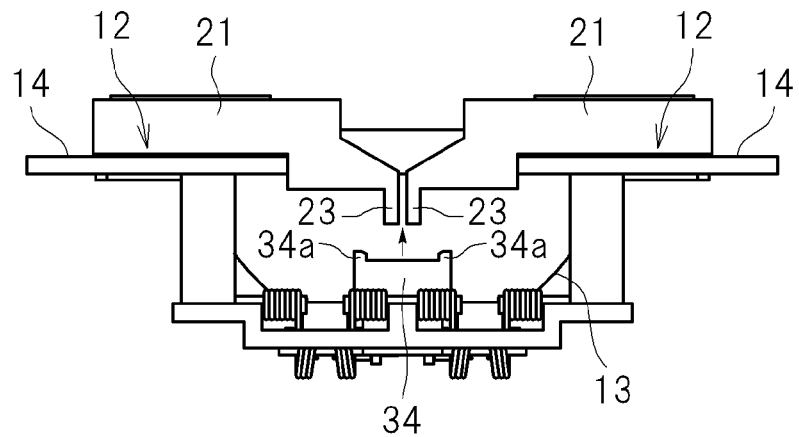
FIG. 13A shows the stand device body in a normal state.
Figure 13B:
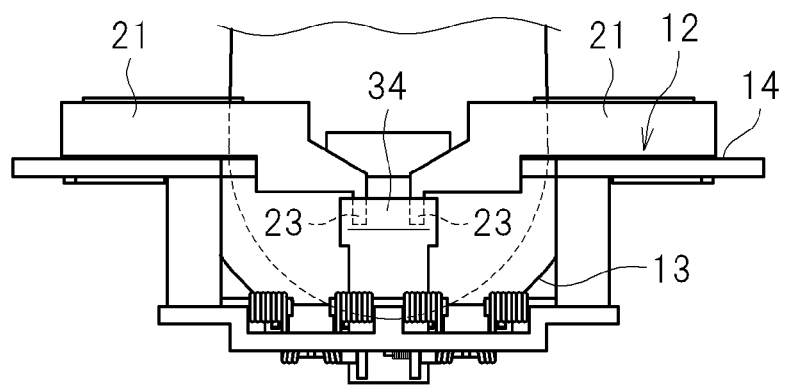
FIG. 13B shows the stand device body with the second controller mounted therein.
Figure 13C:
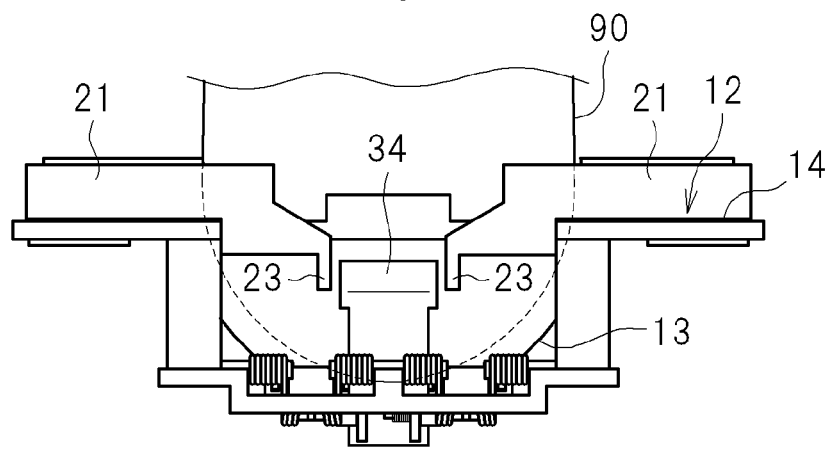
FIG. 13C shows the stand device body with the first controller mounted therein.

FIGS. 12 and 13 are diagrams showing movement of the stopper mechanism 30. FIG. 12 is a cross sectional view along the same line shown in FIG. 5. FIG. 12A shows the stand device body 11 in a normal state; and FIG. 12B is the stand device body 11 with the second controller 80 mounted therein. FIG. 13 is a rear view of the stand device body 11. FIG. 13A shows the stand device body 11 in a normal state, similar to FIG. 7; FIG. 13B shows the stand device body 11 with the second controller 80 mounted therein; and FIG. 13C shows the stand device body 11 with the first controller 90 mounted therein.

The pressed portion 33 is arranged so that the controller 80, 90 having reached a predetermined position (hereinafter referred to as a proper position) in the support concave 13 can hit the pressed portion 33. In this example, as shown in FIG. 5, the pressed portion 33 is provided at the bottom of the support concave 13. In detail, an opening 13a is formed on the bottom surface 13h of the support concave 13 so that the pressed portion 33 protrudes upward out of the opening 13a.

The lever 31 can turn around the fulcrum 32 between two positions. One position is the position of the lever 31 shown in FIG. 12A, in which the pressed portion 33 protrudes out upward from the bottom surface 13h and one end of the lever 31 contacts on the lower surface of the support concave 13 (hereafter referred to as a normal lever position). The other position is the position of the lever 31 shown in FIG. 12B, in which the height of the top surface of the pressed portion 33 is substantially equal to the bottom surface 13h (hereafter referred to as a pressed lever position). Therefore, as shown in FIG. 12, when the lower portion of the controllers 80, 90 is properly inserted in the support concave 13 (that is, when the controller 80, 90 is placed in the proper position), the bottom surface 83, 93 of the controller 80, 90 hits on and thereby presses down the pressed portion 33 such that the height of the top surface of the pressed portion 33 becomes substantially equal to the bottom surface 13h. In this regard, as shown in FIG. 5, a spring 35 for urging the lever 31 toward the normal lever position is provided between the lower surface of the support concave 13 and the lever 31.

Note that "the proper position" in the support concave 13 is defined as the lowest position in which the controller 80, 90 in the support concave 13 can be positioned. In this example, "the proper position" is the position of the controller 80, 90 with the above described engaging pin 25 provided to the support member 21 fit in the recess 80a, 90a formed on the controller 80, 90.

As described above, as the stopper portion 34a is positioned on the opposite side of the fulcrum 32 from the pressed portion 33, the stopper portion 34a moves in the direction opposite to the direction in which the pressed portion 33 moves, employing the fulcrum 32 as the axis, as shown in FIG. 12. That is, the stopper portion 34a moves upward when the pressed portion 33 moves downward.

When the pressed portion 33 moves downward, the stopper portion 34a moves so as to restrict movement of the support member 21. In this example, with the second controller 80 having reached the proper position in the support concave 13, the stopper portion 34a prevents the movement of the support member 21 toward the first support position beyond the second support position. Specifically, as shown in FIGS. 13A and 13B, with the second controller 80 having reached the proper position and the pressed portion 33 having moved downward, the stopper portion 34a moves to a position on the path of the support member 21 moving toward the first support position, and resultantly, functions as a stopper to prevent the support member 21 from moving toward the first support position beyond the second support position.

In this example, as shown in FIG. 5 or 7, the support member 21 has a stopped portion 23 protruding downward on the rear portion 21g. The stopped portions 23 of the left and right support members 21 are positioned facing each other. In this example, each of the rear portions 21g of the respective support members 21 has an extension 23a extending toward the support member 21 on the opposite side (that is, toward a plane P2 defined in parallel to the front-rear direction and including the central line C of the support concave 13). The stopped portion 23 protrudes downward from the tip end of the extension 23a, and the left and right stopped portions 23 are positioned on the both sides of the plane P2 and face each other with a slight interval. As shown in FIG. 7, the arm 34 of the lever 31 is positioned below the stopped portion 23. The tip end of the arm 34 has two stopper portions 34a formed thereon, which have a form of walls facing each other in the left-right direction. Similar to the stopped portions 23, the two stopper portions 34a are positioned on the both sides of the plane P2 with an interval larger than that between the left and right stopped portions 23.

As shown in FIG. 13, the left and right stopped portions 23 move away from each other from their normal positions shown in FIGS. 13A and 7 due to the movement of the support member 21. The normal position of the stopped portions 23 (a stopped portion normal position) is defined as a position of the stopped portion 23 at the time when the support member 21 is positioned in the normal position, that is, a position in which the left and right stopped portions 23 are positioned closest to each other (hereinafter referred to as a closest position). When the first controller 90 is inserted, the stopped portions 23 move from the closest position to the position of the stopped portion 23 shown in FIG. 13C (a first stopped portion position, an un-locked position in which movement of the stopped portion 23 is not restricted by the stopper portion 34a, in other words, a position in which the left and right stopped portions 23 are positioned most apart from each other, hereinafter referred to as a most distant position). Meanwhile, when the second controller 80 is inserted in the support concave 13, the stopped portion 23 moves from the closest position to the position of the stopped portion 23 shown in FIG. 13B (a second stopped portion position, in other words, a locked position in which movement of the stopped portion 23 is restricted by the stopper portion 34a, hereinafter referred to as a middle distant position).

As shown in FIG. 12B or 13B, when the second controller 80 is inserted into the support concave 13, the bottom surface 83 of the second controller 80 presses the left and right support members 21 open, so that the two stopped portions 23 are resultantly placed in the middle distant position. In the above, the bottom surface 83 of the second controller 80 presses down the pressed portion 33 of the lever 31, which causes the left and right stopper portions 34a to move upward to a position on the path of the stopped portions 23 and sandwich there the two stopped portions 23 in the middle distant position. As a result, the movement of the stopped portion 23 beyond the middle distant position is prevented, and accordingly, the movement of the left and right support members 21 from the second support position to become farther apart from each other is blocked. This ensures more reliable standing of the second controller 80 by the controller stand device 10.

Meanwhile, when the first controller 90 is inserted into the support concave 13, the stopper portion 34a allows the stopped portion 23 to move to the most distant position. In this example, as shown in FIG. 13C, when the first controller 90 is inserted into the support concave 13 and the bottom surface 93 thereof accordingly presses the left and right support members 21 open, the two stopped portions 23 move to the most distant position. In the above, the bottom surface 93 of the first controller 90 presses down the pressed portion 33 of the lever 31, which causes the left and right stopper portions 34a to move upward to a position on the path of the stopped portions 23. However, in this case, the stopped portion 23 passes by the middle distant position before the stopper portion 34a reaches a position on the path of the stopped portion 23. That is, timing for the stopper portion 34a to reach the path of the stopped portion 23 and that for the lever 31 to start turning are set such that the stopper portion 34a reaches a position on the path of the stopped portion 23 after the stopped portion 23 passes by the middle distant position. Such timing setting can be achieved by adjusting, e.g., in designing the controller stand device 10, the height of the pressed portion 33 and/or the distance from the stopper portion 34a in a normal state to the position on the path of the stopped portion 23, depending on the thickness of the first controller 90 and the shape of the bottom surface 93. In this regard, when the second controller 80 is inserted into the support concave 13, the stopper portion 34a reaches a position on the path of the stopped portion 23 before the stopped portion 23 passes by the middle distant position. Accordingly, the movement of the stopped portion 23 beyond the middle distant position is blocked.

As shown in FIG. 4, 6, or 9, the controller stand device 10 has a plurality of terminals 4 for electrical connection to the controller 80, 90. The plurality of terminals 4 are arranged below the support concave 13, being aligned in the left-right direction. Further, a contact terminal 83a, 93a having a small plate shape is provided on the bottom surface 83, 93 of the controller 80, 90 for contacting the terminal 4 (see FIG. 1). An electric wire (not shown) is connected to the terminal 4. The terminal 4 is used, e.g., as a terminal for charging the controller 80, 90.

As shown in FIG. 6, the terminal 4 is formed using elongated metal material (a torsion spring in this example), and placed in substantially parallel to the lever 31. The terminal 4 has a contact portion 4a formed on the tip end thereof. The contact portion 4a is accommodated in the pedestal 12. In this example, a plurality of terminal holes 13c are formed on the bottom surface 13h of the support concave 13, being aligned in the left-right direction. The support concave 13 has a storage wall 13d formed upright on the edge of the terminal hole 13c. The contact portion 4a is formed to protrude upward out of the terminal hole 13c and enclosed by the storage wall 13d. The contact portion 4a is arranged inside the storage wall 13d in this manner.

A plurality of concaves are formed on the bottom surface 83, 93 of the controller 80, 90, and the contact terminal 83a, 93a is formed inside the concave. Therefore, with the controller 80, 90 having reached the proper position in the support concave 13, the storage wall 13d is inserted into the concave formed on the bottom surface 83, 93.

Figure 14A:
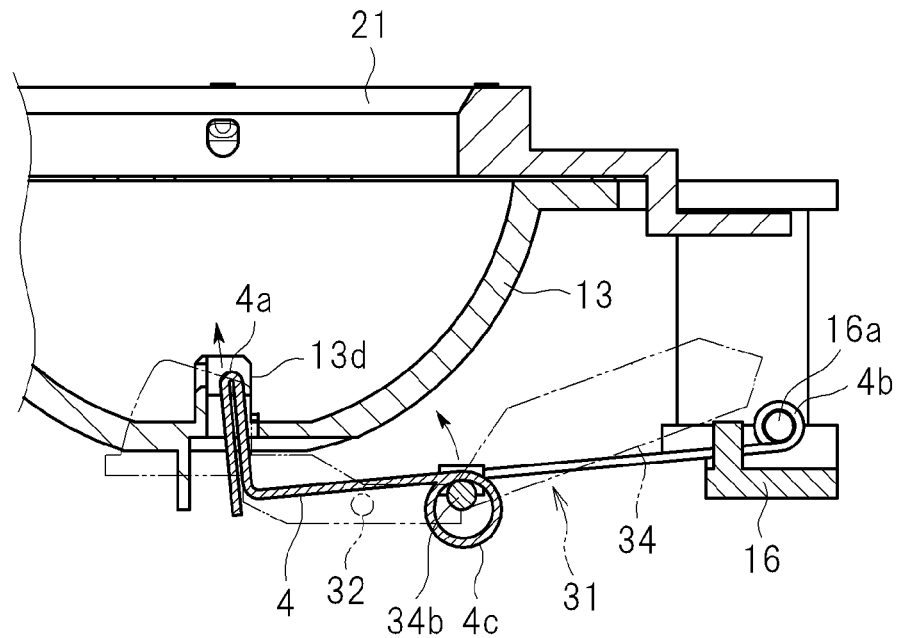
FIG. 14A shows the stand device body in a normal state and FIG. 14B shows the stand device body with a controller mounted therein.
Figure 14B:
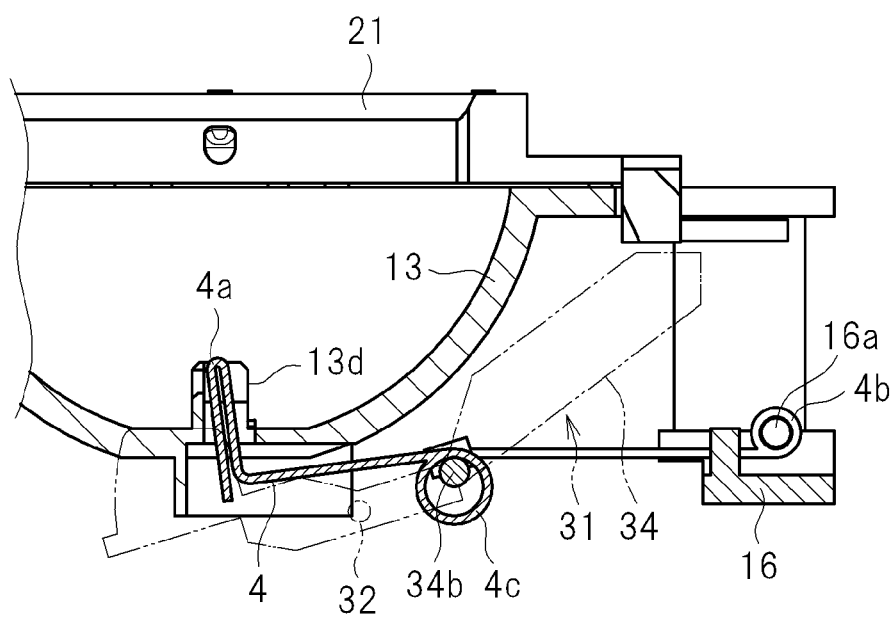

FIG. 14 is a diagram explaining movement of the terminal 4. Specifically, FIG. 14 shows a cross sectional view along the line same as that of FIG. 6. FIG. 14A shows the stand device body 11 in a normal state, similar to FIG. 6; and FIG. 14B shows the stand device body 11 with the second controller 80 mounted therein.

The contact portion 4a of the terminal 4 is provided capable of moving together with the pressed portion 33 of the lever 31. Specifically, the contact portion 4a is provided capable of protruding out toward the inside of the support concave 13 when the pressed portion 33 moves downward. In this example, the lever 31 is connected to the terminal 4 so that the contact portion 4a protrudes upward out of the storage wall 13d when the pressed portion 33 moves downward.

In detail, as shown in FIG. 6, the terminal 4 has, on the end thereof (the end opposite from the contact portion 4a), a fulcrum 4b retained so as to rotate. In addition, the terminal 4 has a joint 4c jointed to the lever 31. The contact portion 4a and the joint 4c are located in the same direction relative from the fulcrum 4b. That is, the joint 4c is located between the fulcrum 4b and the contact portion 4a. As described above, the lever 31 has the arm 34 extending in the direction opposite from the pressed portion 33. The joint 4c is connected to the arm 34.

As described above, with the pressed portion 33 being pressed down, the arm 34 moves upward around the fulcrum 32 (see FIG. 12B). Therefore, as shown in FIG. 14B, with the pressed portion 33 being pressed down, the joint 4c moves upward. Further, because the contact portion 4a is located in the same direction as the joint 4c relative to the fulcrum 4b, the contact portion 4a moves around the fulcrum 4b in the same direction as that in which the joint 4c moves. That is, as shown in FIG. 14, the contact portion 4a moves upward together with the joint 4c. As a result, the end of the contact portion 4a protrudes upward out of the storage wall 13d formed in the support concave 13.

As shown in FIG. 7, in this example, the fulcrum 4b is formed in a coil shape. Meanwhile, a lower panel 16 is provided below the upper panel 14 of the pedestal 12, being connected to the upper panel 14 via a pillar 17 extending downward from the upper panel 14. The lower panel 16 has an axial portion 16 along the left-right direction. The coil shaped fulcrum 4b is provided winding around the axial portion 16a and retained so as to rotate.

As shown in FIG. 9, the arm 34 has an axial portion 34b elongated in the left-right direction and passing through the joint 4c formed is a coil shaped.

As shown in FIG. 3 or 5, the support concave 13 has a convex 13e formed therein, which protrudes up toward the inside of the support concave. The convex 13e is positioned at a position apart from the central line C of the support concave 13. In this example, as shown in FIG. 5, the convex 13e is formed on the lateral surface 13f of the support concave 13. Meanwhile, a concave (not shown) for accepting the convex 13e is formed on each of the bottom surfaces 83, 93 of the second controller 80 and the first controller 90. With this arrangement, the controller 80, 90 oriented toward a wrong direction (e.g., when the front surface of the controller 80, 90 facing rearward) can be prevented from being inserted into the support concave 13.

The upper end 13g of the convex 13e is positioned higher than the upper end of the pressed portion 33 and the upper edge of the storage wall 13d. This can prevent the pressed portion 33 from being pressed down by the controller 80, 90 when the controller 80, 90 oriented toward a wrong direction is inserted into the support concave 13. This can further prevent the contact portion 4a of the terminal 4 from protruding upward out of the storage wall 13d when the controller 80, 90 is oriented toward a wrong direction.

As described above, according to the controller stand device 10, the support concave 13 has a size that enables the first controller 90 to be inserted in the support concave 13 and the support member 21 is movable between a position in which the support member 21 contacts on the external circumferential surface of the first controller 90 inserted in the support concave 13 and a position in which the support member 21 contacts on the external circumferential surface of the second controller 80, thinner than the first controller 90, inserted in the support concave 13. Therefore, according to the above described controller stand device 10, any of the first controller 90 and the second controller 80 can stably stand.

Further, the controller stand device 10 includes the stopper mechanism 30. The stopper mechanism 30 includes the pressed portion 33 for moving as being pressed by the controller 80, 90 when the controller 80, 90 being inserted into the support concave 13 reaches the predetermined position (the proper position in the above explanation) in the support concave 13. Further, the stopper mechanism 30 includes the stopper portion 34a movable together with the pressed portion 33, for moving to restrict movement of the support member 21 when the pressed portion 33 moves. According to this structure, it is possible to further stably stand the controller 80, 90 inserted in the support concave 13.

In the above embodiment, the thickness of the second controller 80 is smaller than that of the first controller 90, and the stopper portion 34a restricts the movement of the support member 21 from the second support position to the first support position when the second controller 80 reaches the proper position. With this structure, because the support member 21 does not move toward the first position 90 when the second controller 80 is inserted in the support concave 13, it is possible to further stably stand the second controller 80. In this regard, the stopper portion 34a moves to the position on a path of the support member 21 when the pressed portion 33 moves.

In the controller stand device 10, the second support position is defined as a position located more inward in the support concave 13 than the first support position. The support member 21 is movable between the first support position and the normal position defined more inward than the second position, and is urged toward the normal position. With this structure, because the support member 21 in the second support position is urged toward the normal position, it is possible to further stably stand the second controller 80 when the second controller 80 is inserted in the support concave 13.

In the controller stand device 10, the support member 21 includes the engaging portion (referred as the engaging pin 25 in the above explanation) formed so as to fit to the engaged portion (referred as the recess 80a and 90a in the above explanation) formed on the external surface of each of the first controller 90 and the second controller 80. According to this structure, it is possible to further stably stand any of the first controller 90 and the second controller 80.

In the controller stand device 10, the engaging pin 25 has the tip end 25a protruding from the support member 21 and is capable of retreating. With this structure, a user can more readily insert any of the first controller 90 and the second controller 80 in the support concave 13. Moreover, a user can smoothly pull out the first controller 90 and the second controller 80 from the support concave 13.

Further, the controller stand device 10 includes the two support members 21 facing each other. According to this structure, it is possible to further stably stand any of the first controller 90 and the second controller 80.

Further, the controller stand device 10 includes the terminal 4 having the contact portion 4a for electrical connection to the first controller 90 and the second controller 80. With this structure, it is possible to charge, e.g., the controller 80, 90 inserted in the support concave 13.

Further, the controller stand device 10 includes the pressed portion 33 for moving as being pressed by the controller 80, 90 when the controller 80, 90 being inserted into the support concave 13 reaches the predetermined position (that is, the proper position) in the support concave 13. The pedestal 12 has the storage portion (the storage wall 13d in the above explanation) for accommodating the contact portion 4a of the terminal 4, and the contact portion 4a of the terminal 4 is movable together with the pressed portion 33 and capable of protruding from the storage wall 13d of the pedestal 12 when the pressed portion 33 moves. With this structure, it is possible to prevent the contact portion 4a from contacting on the controller 80, 90 when the position of the controller 80, 90 relative to the contact portion 4a of the terminal 4 is not appropriate.

In the controller stand device 10, the inner surface of the support concave 13 of the pedestal 12 has the convex 13e formed thereon. The convex 13e is at least partly positioned higher than the pressed portion 33 and capable of being inserted into the concave formed on each of the first controller 90 and the second controller 80. With this structure, the contact portion 4a of the terminal 4 can protrude out of the storage wall 13d when the orientation of the controller 80, 90 relative to the support concave 13 is appropriate.

Further, in the controller stand device 10, the support member 21 includes the contact portion 21a for contacting on at least two positions on the external circumferential surface of each of the first controller 90 and the second controller 80. According to this structure, it is possible to further stably stand the controller 80, 90 inserted in the support concave 13.

Further, the at least two positions on which the contact portion 21a contacts is located on opposite sides to each other across the plane surface, and the plane surface includes the central line C in the vertical direction of the support concave 13 and is in parallel to the moving direction of the support member 21. With this structure, it is possible to prevent the controller 80, 90 inserted in the support concave 13 from inclining in a direction orthogonal to the moving direction of the support member 21.

Note that the present invention is not limited to the above described controller stand device 10 or controller stand system 1, and is adapted to various modifications.

For example, although it is described in the above that the first controller 90 and the second controller 80 are both substantially cylindrical, the controller for standing on the controller stand device 10 is not limited to the above, and may be formed, e.g., rectangular. Further, the present invention can be applied to a controller having a shape different from a cylinder or a rectangle but suitable in view of the manner of operation by a user.

Although it is described in the above that the first controller 90 and the second controller 80 are both substantial cylindrical, one of the first controller 90 and the second controller 80 may be formed substantially cylindrical while the other may be formed, e.g., substantially rectangular.

Although it is described in the above that the controller 80, 90 is held upright in the up-down direction, the support concave 13 of the controller stand device 10 may be formed so as to stand the controller 80, 90 slightly inclining forward or rearward.

Although it is described in the above that the bottom surfaces 83, 93 of the controllers 80, 90 are formed hemispherical and the support concave 13 is formed accordingly hemispherical, the shapes of the bottom surfaces 83, 93 and the support concave 13 are not limited to the above and the shapes of the bottom surfaces 83, 93 may be flat planes. In the latter case, the bottom portion of the support concave 13 may also be formed flat.

Although it is described in the above that the support member 21 is provided on the upper panel 14, the support member 21 may be provided above the upper panel 14 apart therefrom and attached to a member other than the upper panel 14 mounted on the pedestal 12.

Although it is described in the above that the two support members 21 are both movable, only one of the two support members 21 may be movable.

Figure 15A:
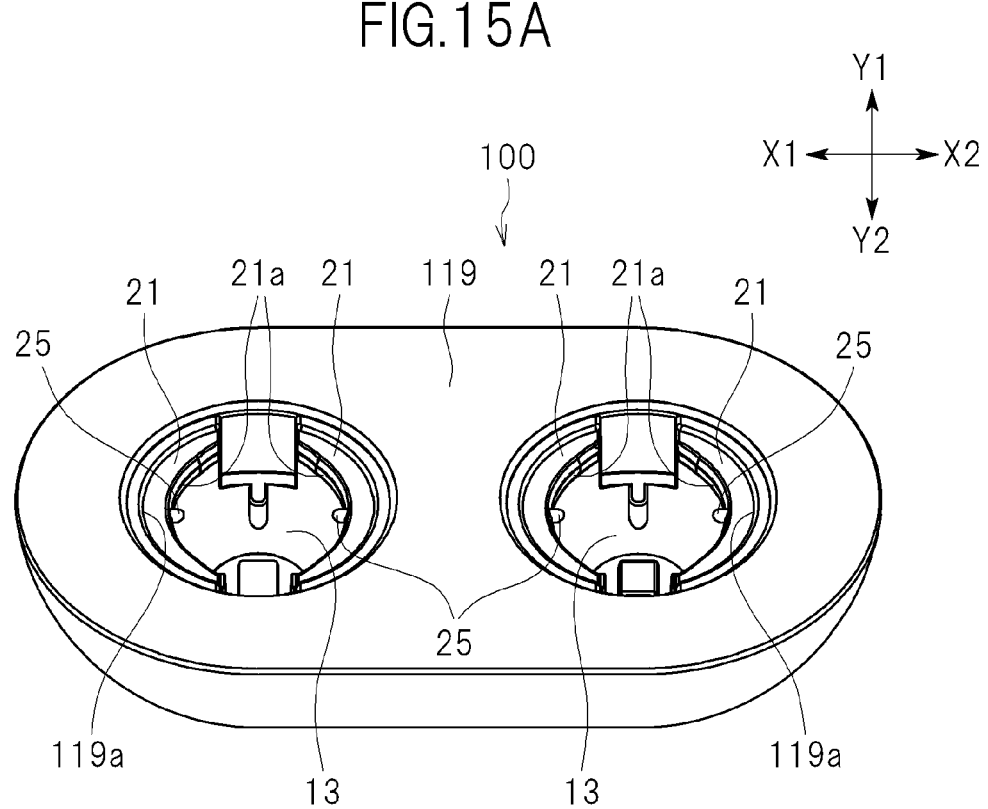
FIG. 15A shows the controller stand device viewed diagonally from above.
Figure 15B:
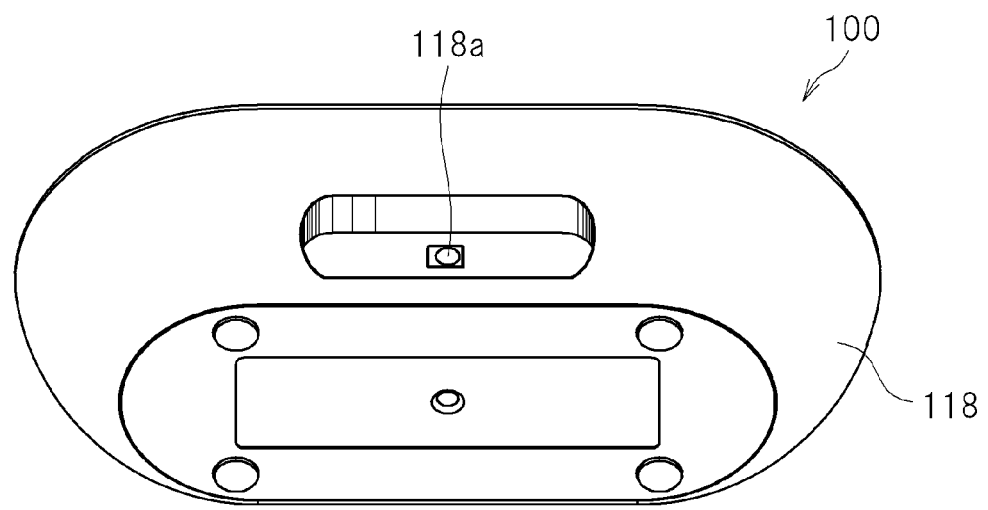
FIG. 15B shows the controller stand device viewed diagonally from below.

Although it is described in the above that one support concave 13 is formed on the pedestal 12 of the controller stand device 10, the number of support concave 13 formed on the pedestal 12 is not limited to the above. That is, a plurality of (e.g., two or more) support concaves 13 may be formed on the pedestal 12 and the support member 21 may be provided in each support concave 13. FIG. 15 is a perspective view showing an example of the controller stand device 100 in this embodiment. FIG. 15A shows the controller stand device 100 viewed diagonally from above; and FIG. 15B shows the controller stand device 100 viewed diagonally from below. FIG. 16 is a perspective view of the controller stand device 100 with a cover member 119 removed. Members identical to those having been described above are given identical reference numerals with descriptions thereof not repeated here.

As shown in FIG. 16, the controller stand device 100 has a pedestal 112 having an upper panel 114 elongated in the left-right direction. The upper panel 114 has two support concaves 13 formed thereon, each having two support members 21, similar to the above described controller stand device 10. The two support members 21 of each support concave 13 are arranged facing each other in the left-right direction, and provided capable of opening and closing. The two support concaves 13 are aligned in the direction in which the support members 21 face each other, that is, in the left-right direction. This arrangement makes it easier to equally apply a force to the left and right support members 21 when a user positioned facing the front surface of the controller stand device 100 inserts or removes the controller 80, 90 with respect to the support concave 13. In this regard, the two support concaves 13 are formed apart from each other in the left-right direction with a space ensured between the inner two of the four support members aligned in the left-right direction in order to allow movement of the two support members.

As shown in FIG. 15A, two round openings 119a are formed on the cover member 119. The support member 21 is located inward beyond the inner circumferential edge of the opening 119a, and the contact surface 21a of the support member 21 is exposed in the opening 119a. As shown in FIG. 15B, the controller stand device 100 has a housing 118 open upward. The housing 118 is formed in a bowl shape elongated in the left-right direction with the pedestal 112 and the support members 21 are arranged inside thereof, as shown in FIG. 16. In this example, the housing 118 is formed having a cross section (a cross section with a cross sectional surface orthogonal to the vertical direction) that becomes larger as it goes upward. As described above, each support concave 13 has a terminal 4 formed therein for electrical connection to the controller 80, 90. A hole 118a is formed on the lateral surface of the housing 118, through which the cable connected to the terminal 4 passes.

As described above, in the controller stand device 100, the pedestal 112 has two support concaves 13 formed thereon, and the support member 21 is provided to each of the two support concaves 13. According to this structure, it is possible to stand both of the first controller 90 and the second controller 80 at the same time. Further, it is possible to stand the first controller 90 and the second controller 80 in any of the support concaves 13.

What is claimed is:

1. A controller stand device, comprising:
   a pedestal having a concave formed thereon, the concave having a size that enables insertion therein of any of a first controller and a second controller having thicknesses different from each other,
   wherein the first controller and the second controller each have a cylindrical body and a hemispherical end, and
   wherein the concave is substantially hemispherical;
   a support member mounted on the pedestal so as to move between a first position and a normal position, a second position being defined in a movement path between the first position and the normal position, wherein the support member is pressed onto an external surface of the first controller to be located at the first position when the first controller is inserted in the concave, wherein the support member is pressed onto an external surface of the second controller to be located at the second position when the second controller is inserted in the concave; and
   a stopper mechanism for restricting movement of the support member,
   wherein
   the stopper mechanism includes
      a pressed portion which is pressed by the controller to move when the controller is inserted into the concave and reaches a predetermined position in the concave,
      a stopper portion movable together with the pressed portion between a third position spaced away from the movement path of the support member and a fourth position defined in a middle of the movement path of the support member, wherein the fourth position is a position where the stopper portion engages with the support member to restrict the support member from moving from the second position to first position, the stopper portion moves from the third position to the fourth position when the pressed portion is pressed to move.

2. The controller stand device according to claim 1, wherein
   the thickness of the second controller is smaller than that of the first controller, and
   the stopper portion restricts movement of the support member from the second position to the first position when the second controller reaches the predetermined position.

3. The controller stand device according to claim 1, wherein
   the second position is defined more inward in the concave than the first position,
   the normal position is defined more inward in the concave than the second position,
   the support member is urged toward the normal position.

4. The controller stand device according to claim 1, wherein the support member includes an engaging portion formed so as to fit to an engaged portion formed on the external surface of each of the first controller and the second controller.

5. The controller stand device according to claim 4, wherein the engaging portion has a tip end protruding from the support member and is capable of retreating.

6. The controller stand device according to claim 1, comprising two support members each serving as the support member and facing each other.

7. The controller stand device according to claim 1, further comprising a terminal having a contact portion for electrical connection to the first controller and the second controller.

8. The controller stand device according to claim 7, wherein the pedestal has a storage portion for accommodating the contact portion of the terminal, and the contact portion of the terminal is movable together with the pressed portion, and capable of protruding from the storage portion of the pedestal when the pressed portion moves.

9. The controller stand device according to claim 7, wherein an inner surface of the concave of the pedestal having a convex formed thereon, the convex being at least partly positioned higher than the pressed portion and capable of being inserted into a concave formed on each of the first controller and the second controller.

10. The controller stand device according to claim 1, wherein the support member includes a contact portion for contacting on at least two positions on the external circumferential surface of each of the first controller and the second controller.

11. The controller stand device according to claim 10, wherein the at least two positions are located on opposite sides to each other across a plane surface which includes a central line in a vertical direction of the concave and is parallel to a moving direction of the support member.

12. The controller stand device according to claim 1, wherein
the pedestal has two concaves formed thereon, each of which serves as the concave, and
the support member is provided to each of the two concaves.

13. A controller stand system, comprising:
a first controller;
a second controller having a thickness different from that of the first controller,
wherein the first controller and the second controller each have a cylindrical body and a hemispherical end; and
a controller stand device for standing the first controller and the second controller,
wherein
the controller stand device includes
a pedestal having a concave formed thereon, the concave having a size that enables insertion therein of any of a first controller and a second controller each formed into a rod shape and having thicknesses different from each other,
wherein the concave is substantially hemispherical;
a support member mounted on the pedestal so as to move between a first position and a normal position, a second position being defined in a movement path between the first position and the normal position, wherein the support member is pressed onto an external surface of the first controller to be located at the first position when the first controller is inserted in the concave, wherein the support member is pressed onto an external surface of the second controller to be located at the second position when the second controller is inserted in the concave; and
a stopper mechanism for restricting movement of the support member,
wherein
the stopper mechanism includes
a pressed portion which is pressed by the controller to move when the controller inserted into the concave and reaches a predetermined position in the concave,
a stopper portion movable together with the pressed portion between a third position spaced away from the movement path of the support member and a fourth position defined in a middle of the movement path of the support member, wherein the fourth position is a position where the stopper portion engages with the support member to restrict the support member from moving from the second position to first position, the stopper portion moves from the third position to the fourth position when the pressed portion is pressed to move.

* * * * *